(12) United States Patent
Prociw

(10) Patent No.: US 8,781,456 B2
(45) Date of Patent: Jul. 15, 2014

(54) SYSTEM AND METHOD FOR CONTROLLING MOBILE COMMUNICATION DEVICES

(75) Inventor: Philip James Prociw, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

(21) Appl. No.: 13/634,235

(22) PCT Filed: Jan. 7, 2011

(86) PCT No.: PCT/CA2011/000013
§ 371 (c)(1),
(2), (4) Date: Sep. 11, 2012

(87) PCT Pub. No.: WO2012/092654
PCT Pub. Date: Jul. 12, 2012

(65) Prior Publication Data
US 2013/0005405 A1    Jan. 3, 2013

(51) Int. Cl.
*H04M 3/00*    (2006.01)
(52) U.S. Cl.
USPC .................... 455/418; 455/456.1; 455/456.6; 455/456.2
(58) Field of Classification Search
USPC .......................... 455/418, 456.6, 456.2, 456.1
See application file for complete search history.

(56) References Cited

U.S. PATENT DOCUMENTS

| | | | |
|---|---|---|---|
| 6,144,989 A | 11/2000 | Hodjat et al. | |
| 6,554,707 B1 | 4/2003 | Sinclair et al. | |
| 7,027,987 B1 | 4/2006 | Franz et al. | |
| 7,729,904 B2 | 6/2010 | Bennett | |
| 7,739,210 B2 | 6/2010 | Horvitz et al. | |
| 7,752,152 B2 | 7/2010 | Paek et al. | |
| 7,752,159 B2 | 7/2010 | Nelken et al. | |
| 2005/0114493 A1 | 5/2005 | Mandato et al. | |
| 2006/0017543 A1* | 1/2006 | Feinberg | 340/10.1 |
| 2006/0168335 A1* | 7/2006 | Hodjat et al. | 709/239 |
| 2009/0005071 A1* | 1/2009 | Forstall et al. | 455/456.1 |
| 2010/0058196 A1 | 3/2010 | Krishnan et al. | |
| 2012/0052880 A1* | 3/2012 | Hymel et al. | 455/456.3 |

OTHER PUBLICATIONS

Claburn, T.; "Google Reinvents Search for Mobile Era"; Dec. 8, 2009; http://www.informationweek.com/story/showArticle.jhtml?articleID=222000946.
Cha, B.; "Google Voice Search comes to BlackBerrys"; Mar. 25, 2009; http://news.cnet.com/8301-17938_105-10204643-1.html.
Bellotti, V. et al.; "Activity-Based Serendipitous Recommendations with the Magitti Mobile Leisure Guide"; CHI 2008 Proceedings—On the Move; Apr. 5 to 10, 2008, Florence, Italy; pp. 1157 to 1165.

(Continued)

*Primary Examiner* — Danh Le
(74) *Attorney, Agent, or Firm* — Brett J. Slaney; Blake, Cassels & Graydon LLP

(57) ABSTRACT

A system and method are provided for controlling a mobile device. The method includes, during use of the mobile device, interpreting at least one item, the at least one item corresponding to data or events detectable on the mobile device. At least action may then be determined, which are associated with the at least one item, each action capable of preemptively executing at least a portion of a task using features available on the mobile device. At least one of the actions may then be executed and a result associated with the execution of the at least one action provided.

17 Claims, 21 Drawing Sheets

(56) References Cited

OTHER PUBLICATIONS

Greene, K.; "Smart Phone Suggests Things to Do"; Nov. 13, 2007; Retrieved from the internet Jul. 23, 2012.

Nakatsuru, T. et al.; "Context-aware information provision to the mobile phone standby screen"; Proceedings of the 7$^{th}$ International Conference on Mobile Data Management (MDM '06); 2006; IEEE; http://www.computer.org/portal/web/csdl/doi/10/1109/MCM.2006.54.

"Cellphone transformers with artificial intelligence in movies and real life"; Posted online Feb. 27, 2008 by yaromir; http://www.analytical1st.com/2008/02/cellphone-transformers-with-artificial-html.

Buhler, D. et al.; "Flexible MultimodalHuman-Machine Interaction in Mobile Environments"; 2002 ; In ECAI Workshop on Artificial Intelligence n in Mobile Systems (AIMS); pp. 66 to 70; http://smartkom.dfki.de/Vortraege/EML/Flexible_Multimodal_Interaction.pdf.

Cray, C. et al.; Abstract from "AIMS 2005: Artificial intelligence in mobile systems"; Proceedings of the 7th international conference on Human computer interaction with mobile devices & services (Mobile HCI'05); 2005; pp. 353 to354; ACM; ISBN:1-59593-089-2.

"Smart Action Looks to Add Artificial Intelligence to Phone Calls"; Jan. 12, 2009; Extract from http://www.socaltech.com/smart_action_looks_to_add_artificial_intelligence_to_phone_calls/s-0019326.html.

"Nearest Tube IPhone augmented reality application"; Aug. 2009; http://robotzeitgeist.com/2009/08/nearest-tube-iphone-augmented-reality.html.

* cited by examiner

SYSTEM AND METHOD FOR CONTROLLING MOBILE COMMUNICATION DEVICES

TECHNICAL FIELD

The following relates to systems and methods for controlling mobile communication devices.

DESCRIPTION OF THE RELATED ART

Mobile communication devices such as smart phones, cellular telephones, personal digital assistants (PDAs), tablet and laptop computers, portable gaming devices, and the like, often provide several features such as applications, communication media (e.g. voice, email, text messaging, instant messaging, social media, etc.), sensors and other components.

Despite having the ability to have and use such a wide variety of features, the capabilities of a mobile communication device are sometimes not fully utilized.

BRIEF DESCRIPTION OF THE DRAWINGS

Embodiments will now be described by way of example only with reference to the appended drawings wherein.

DETAILED DESCRIPTION

Figure 1:
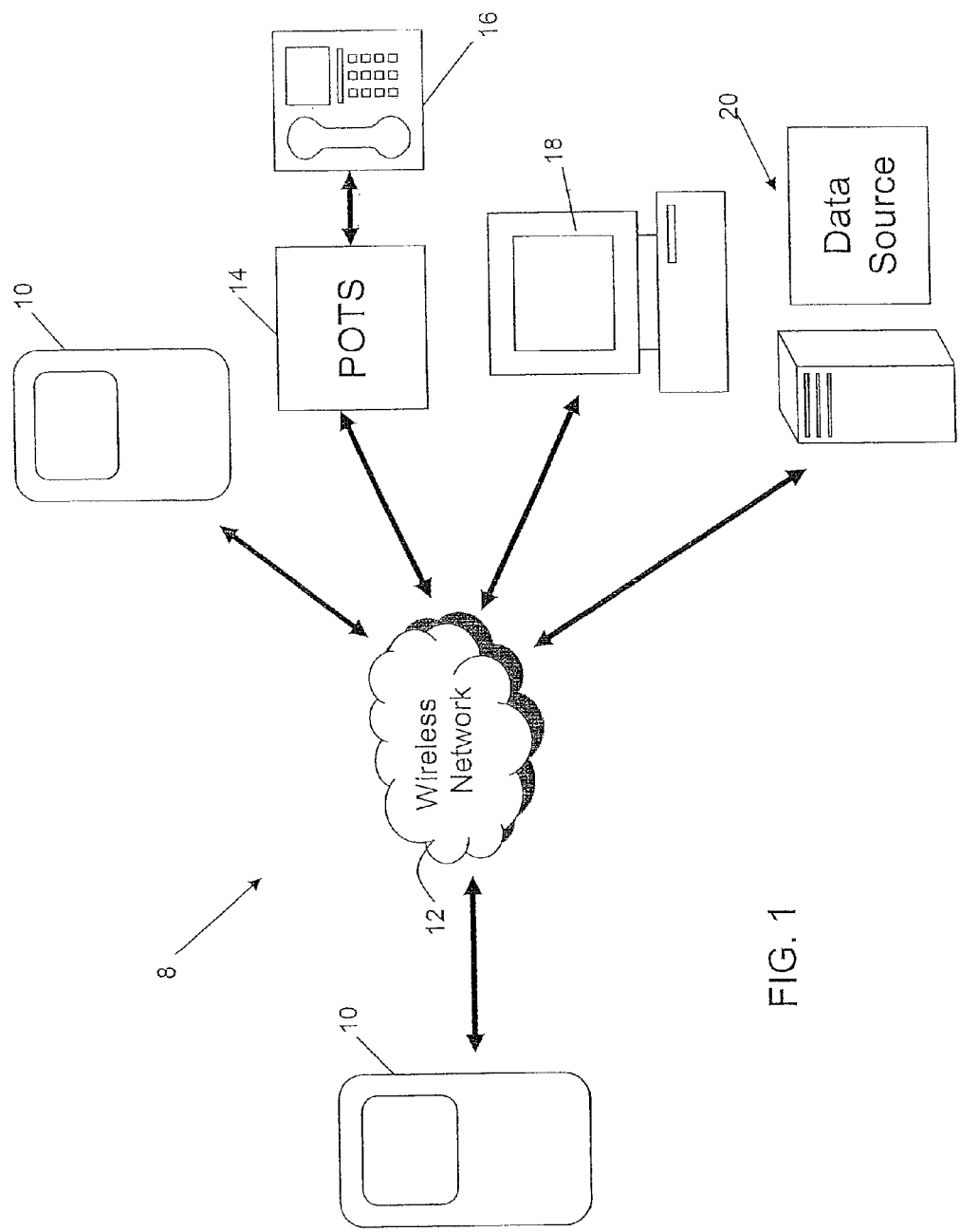
FIG. 1 is a block diagram of an example communication system.

It will be appreciated that for simplicity and clarity of illustration, where considered appropriate, reference numerals may be repeated among the figures to indicate corresponding or analogous elements. In addition, numerous specific details are set forth in order to provide a thorough understanding of the example embodiments described herein. However, it will be understood by those of ordinary skill in the art that the example embodiments described herein may be practised without these specific details. In other instances, well-known methods, procedures and components have not been described in detail so as not to obscure the example embodiments described herein. Also, the description is not to be considered as limiting the scope of the example embodiments described herein.

It has been recognized that in order to fully utilize the various features provided by mobile communication devices, a central module can be provided that acts as a device-based assistant to preemptively take action to both assist the user and increase the productivity of the user by harnessing multiple options or features on the mobile communication device without requiring the user to necessarily initiate the use of such options or features. For example, as will be shown by way of example below, context obtained from both communication and non-communication based data can be used to correlate information and associate keywords and events with potential actions that can be taken. In this way, associations and correlations that are detectable on the mobile communication device can be used to understand what the user is doing in order to assist them with performing one or more next or future operations or actions.

Although the principles discussed below are applicable to any electronic communication device, examples will be provided for a mobile communication device, which is one of many types of electronic communication devices.

For clarity in the discussion below, mobile communication devices may be commonly referred to as "mobile devices" for brevity. Examples of applicable mobile devices may include, without limitation, cellular phones, smart-phones, wireless organizers, pagers, personal digital assistants, computers, laptops, handheld or other wireless communication devices, wirelessly enabled notebook computers, portable gaming devices, tablet computers, or any other portable electronic device with processing and communication capabilities.

Turning now to FIG. 1 an example communication system 8 is shown. In this example, a mobile device 10 is shown which is communicably connectable to a wireless network 12 for communicating with various other parties or entities, examples of which are shown in FIG. 1 for illustrative purposes only. In this example, the mobile device 10 may communicate via the wireless network 12 with another mobile device 10, e.g. for participating in voice and/or text-based communications, data transfers, etc. The mobile device 10 may also communicate with a standard wired telephone 16 connectable to the wireless network 12 via a plain-old-telephone-system (POTS) 14 for participating in voice based communications. The mobile device 10 may also communicate with a personal computer 18 for participating in voice and/or text-based communications, data transfers, etc., and a server or other data source 20, e.g. to obtain data feeds or other information by way of download, data transfer/data feed, etc. As such, it can be appreciated that the mobile device 10 may participate in various forms of communications with various types of entities and devices and thus the principles described herein are applicable to any suitable communication carrying any form of data, whether voice-based, text-based, file-based, or otherwise.

Figure 2:
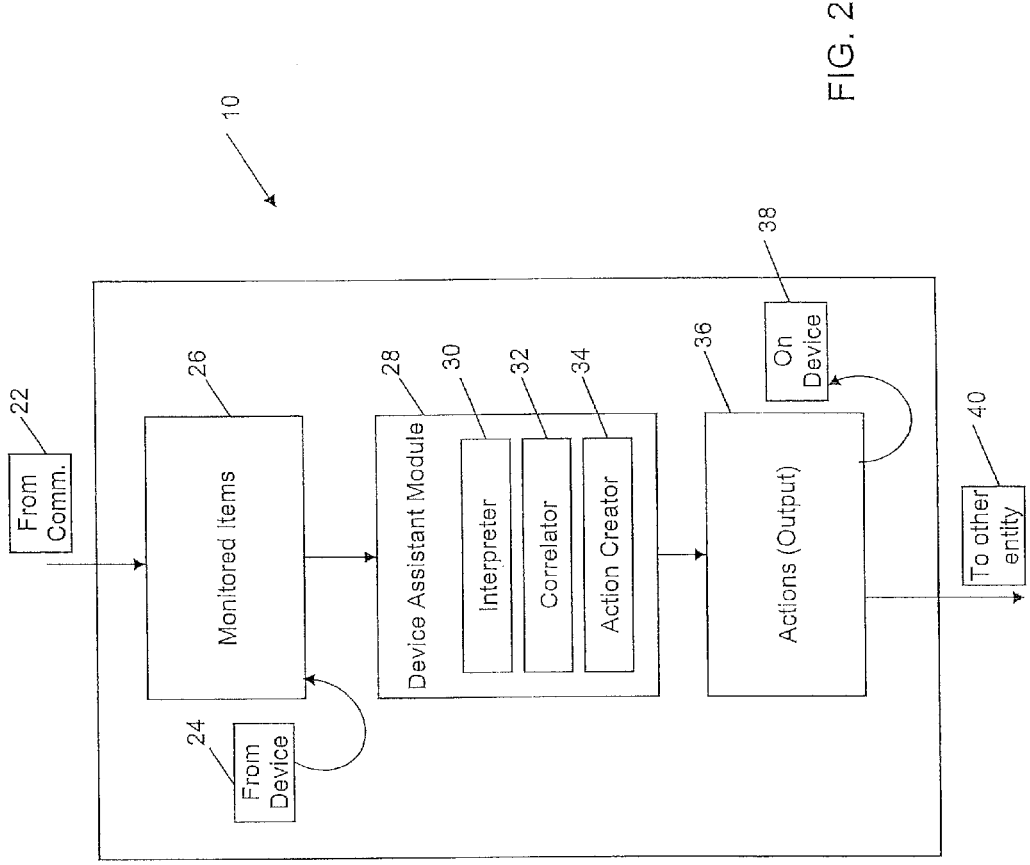
FIG. 2 is a block diagram of an example configuration for a mobile communication device having a device assistant module.

In addition to participating in various forms of communications, the mobile device 10 may also have associated therewith, data which is created and, in some embodiments, stored on and utilized locally by the mobile device 10 and its applications, sensors, etc. The mobile device 10 may also have associated therewith, various events that are detectable thereon. Such events may be generated or detected by various device sub-systems or sensors or both. FIG. 2 illustrates an example configuration for a mobile device 10 wherein a device assistant module 28 is utilized to examine or otherwise determine one or more monitored items 26. As noted above, such monitored items 26 may include communication-based items 22, i.e. data and information obtained from data communications, and device-based items 24, e.g. events or data that are stored or originate on the mobile device 10. In the following, such items 22, 24 may be commonly referred to as "items 26" for simplicity. The device assistant module 28 in this example, includes an interpreter 30 for interpreting (i.e. identifying, ascertaining or discerning) information from the monitored items 26, e.g. keywords from text or voice segments. The device assistant module 28 also includes a correlator 32 for correlating data to associate items with actions 36. For example, as will be shown by way of example below, data acquired during particular periods of time can be correlated to events that have also occurred during the same period of time to determine that information and/or data could be sent to one or more other parties that were associated with that event. The device assistant module 28 in this example also has an action creator 34, which is used to enable various actions 36 or outputs to be created based on what is determined by the interpreter 30 and/or correlator 32. As can be appreciated from the example configuration in FIG. 2, the actions 36 may occur or otherwise be applied on the device; the actions 36 may be device-based actions 38, or may be communication-based actions 40, i.e. those that relate to or in part have a communication associated therewith. In the following, such actions 38, 40 may be commonly referred to as "actions 36" for simplicity.

Figure 3:
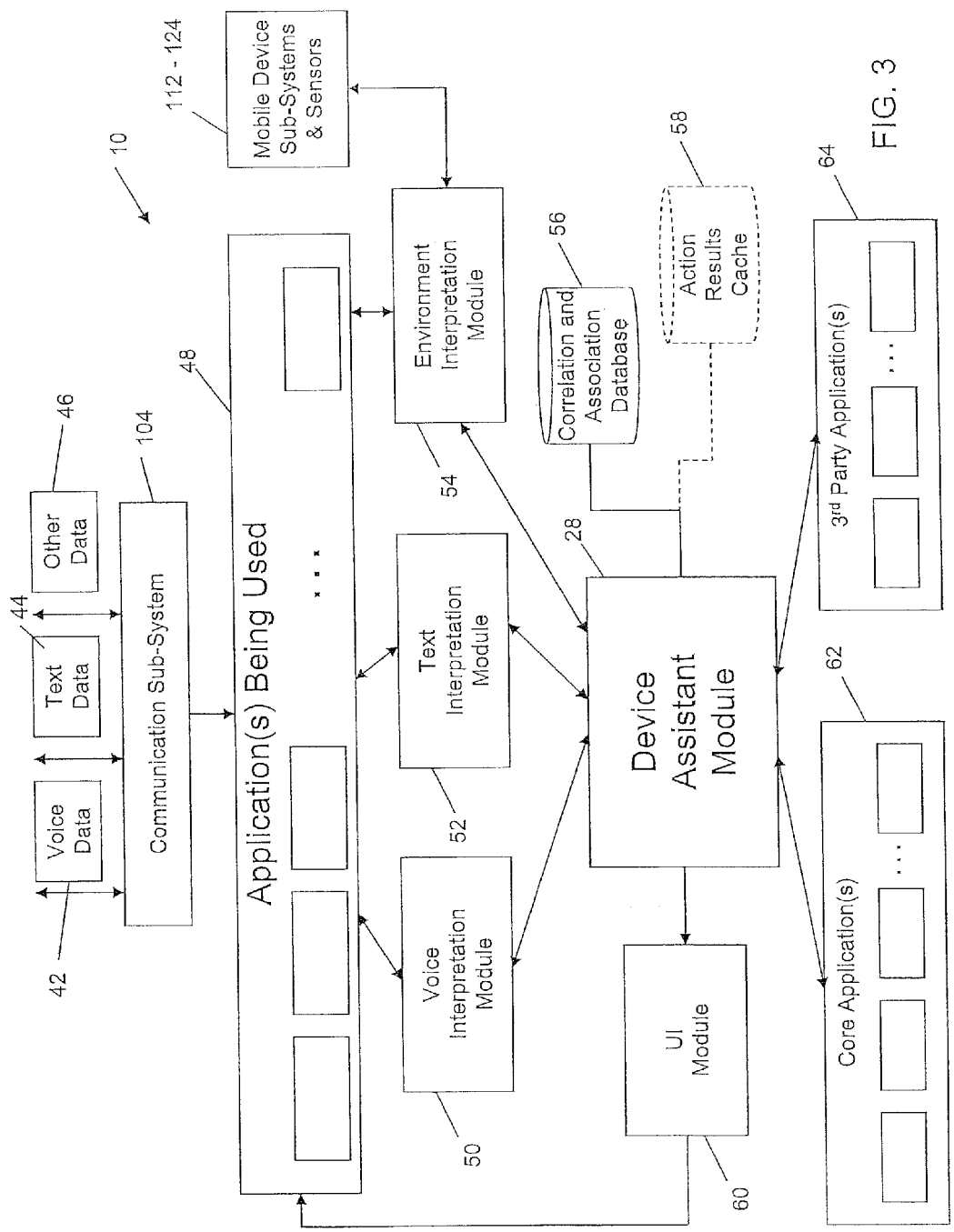
FIG. 3 is a block diagram showing further detail of example configuration for the mobile communication device of FIG. 2.

The device assistant module 28 is shown in greater detail in a further example in FIG. 3. The device assistant module 28 in this example monitors voice data 42, text data 44 and other data 46 which is communicated to or by the mobile device 10 via a communication sub-system 104, using various applications 48 being used by the mobile device 10. The device assistant module 28 also monitors data and information on the mobile device 10 itself (e.g. events, newly created data, data stored to the mobile device's memory, etc.) using various mobile device sub-systems and sensors 112-124 (see FIG. 21 for examples of components 112-124). The monitoring or determining or detecting of events, data, and information performed by the interpreter 30 in this example utilizes a voice interpretation module 50, a text interpretation module 52, and an environment interpretation 54. The modules 50-54 are shown as being distinct from the interpreter 30 and thus the device assistant module 28 itself for illustrative purposes only and it can be appreciated that such modules 50-54 may also be implemented as portions of the device assistant module 28. However, it may also be appreciated that one or more of the modules 50-54 can be external tools that are used by and thus accessed from other applications 48 or components, and may be $3^{rd}$ party tools.

The voice interpretation module 50 in this example corresponds to or at least in part has voice recognition software that is capable of detecting words, phrases and other speech components (e.g. pauses, inflections, etc.) from voice-based data. It can be appreciated that the voice-based data may be part of communication-based voice data 42 or voice data provided to and stored on the mobile device 10 aside from a communication (e.g. voice notes, dictation application, etc.). The voice interpretation module 50 may utilize any suitable voice recognition methods.

The text interpretation module 52 in this example corresponds to or at least in part has text recognition software that is capable of extracting portions of text from communication-based text data 44 or text that is stored on or provided to the mobile device 10 aside from a communication. It can be appreciated that the text interpretation module 52 can be operable to detect keystrokes for determining text entered by a user, can detect text that has already been created (i.e. can be parsed from a data-file, memory, etc.), or both. As such, the text interpretation module 52 may utilize any suitable text recognition or text parsing methods.

The environment interpretation module 54 in this example is operable to both interpret data and events associated with the applications 48 being used as well as data and events associated with the mobile device sub-systems and sensors 112-124. For example, the environment interpretation module 54 may be operable to examine text and data in a calendar entry 248 (see FIG. 11 discussed below), detect a change in time zone (see FIG. 12 discussed below), determine temporal information associated with a stored data item such as a photo 242 (see FIG. 11 discussed below), or detect changes in environment using sensors such as an accelerometer, magnetometer, etc. Therefore, it can be appreciated that the environment interpretation module 54 can be configured to ascertain, detect, or search for various forms of data in various locations on the mobile device 10, and to detect the environment affecting the mobile device 10, in order to determine one or more actions 36 that can assist the user. As will be explained in greater detail below, by automatically interpreting both communications and data on the mobile device 10, the device assistant module 28 can preemptively determine various actions 36 that can be taken and advise the user of such actions 36 or automatically perform at least a portion of such actions 36. This enables the user to be more productive and may serve to remind the user of various tasks that should be performed such as follow up tasks, communications, or the acquisition of more information, etc.

The device assistant module 28 utilizes the monitored items 26 to determine the actions 36 to be taken by associating detected information such as a keyword, with an action; or by correlating related items 26 and associating an action, based on the correlation. The device assistant module 28 in this example includes or otherwise has access to a correlation and association database 56, which may be used to store such associations and logic for correlating various types of monitored items 26. The correlations database 56 may also include or access user preferences or profiles (not shown) to enable the device assistant module 28 to prioritize or streamline actions 36, and to present information in a way that is preferred by the user. In some embodiments, as will be shown below, the actions 36 to be taken may be queued or be designated as "pending" until receiving confirmation that the user wishes to perform the automatically determined actions 36. In such embodiments, an action results cache 58 may be used to temporarily store instructions and data associated with actions 36 that may be initiated. It can be appreciated that depending on the action, one or more portions of a particular action 36 may be queued while one or more other portions are preemptively performed. In order to prompt the user or otherwise provide feedback to the user, the device assistant module 28 may utilize a user interface (UI) module 60.

The device assistant module 28, either automatically or, upon detecting confirmation obtained from the user, may access or otherwise instruct both core applications 62, such as a browser, email application, address book, search function, calendar, contact lists, etc.; and $3^{rd}$ party applications 64, such as downloadable games and other applications. It can be appreciated that $3^{rd}$ party applications 64 may need to be registered with the device assistant module 28 upon installation in order to enable the device assistant module 28 to communicate therewith for performing the various actions 36.

Figure 4:
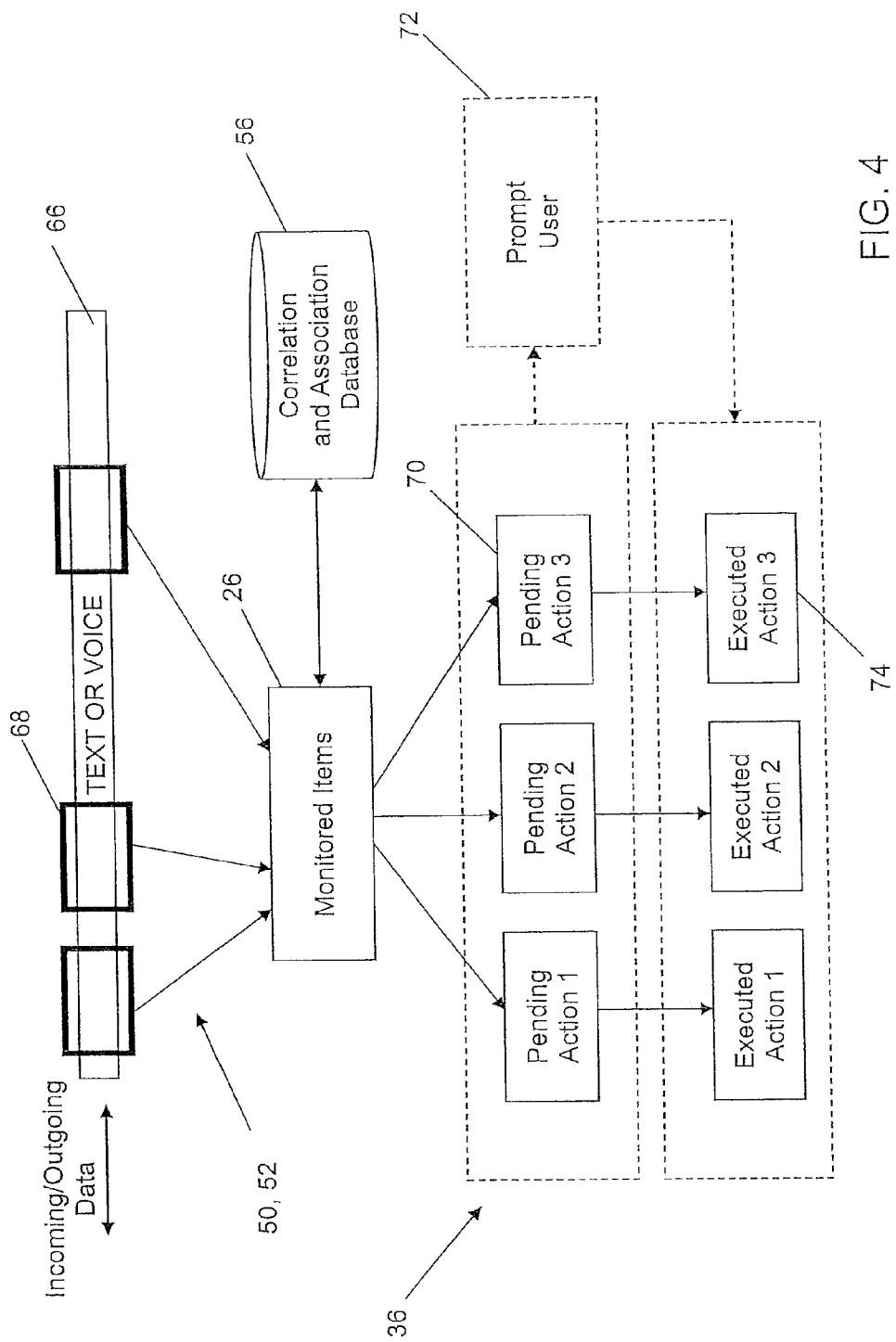
FIG. 4 is a block diagram illustrating an example monitoring method for text or voice communication-based data.

Turning now to FIG. 4, an example is shown illustrating the monitoring of an incoming or outgoing text or voice segment 66 to extract items 68, e.g. using the voice interpretation module 50 or the text interpretation module 52. The items 68 thus extracted become monitored items 26 that can be compared with information in the correlation and association database 56 to determine corresponding actions 36. In this example, for ease of explanation, three items 68 are extracted from the segment 66 and three corresponding actions 36 are identified. As can also be seen in FIG. 4, the actions 36 can have different states. In this example, pending actions 70 are first identified which defines what the corresponding actions 36 should entail but are held back until obtaining confirmation from the use, e.g. using a prompt 72 as shown in dashed lines. Upon obtaining confirmation from the user or otherwise determining that the actions 36 are to be executed (e.g. the actions 36 may be executed automatically either immediately or upon a predetermined amount of time passing or the detection of another event such as inactivity or low interactively with the mobile device 10), the actions 36 may be executed thus transitioning to executed actions 74.

Figure 5:
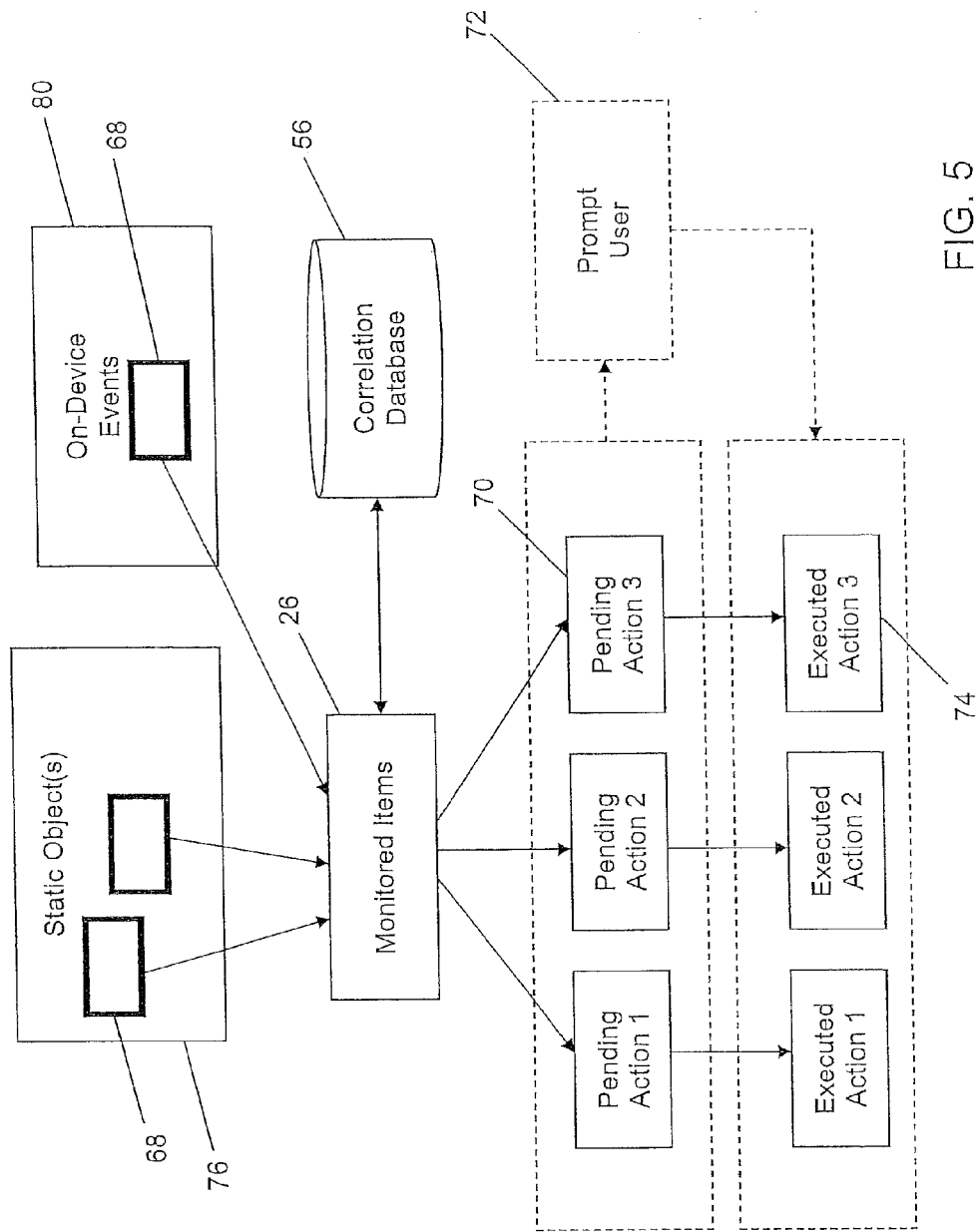
FIG. 5 is a block diagram illustrating an example monitoring method for non-communication-based data.

FIG. 5 illustrates an example wherein the monitored items 26 include one or more items detected from non-communication based data such as static objects 76 or on-device events 80. In such examples, the extracted items 68 correspond to portions of data that are detectable on the mobile device 10 but that are not necessarily related to an ongoing communication. For example, whereas the example shown in FIG. 4 may obtain keywords from voice and text-based communications such as a phone call or instant messaging session, the examples shown in FIG. 5 may obtain keywords from reminders or calendar entries, detect changes in location or orientation, detect changes in time zone, etc. As such, it can be appreciated from FIGS. 4 and 5 that the monitored items 26 may include any data or information that is detectable on the mobile device 10, including information and data associated with communications, events on the mobile device 10, the environment in which the mobile device 10 is operating, data stored to the mobile device 10, interactivity with the mobile device 10, to name a few.

Figure 6:
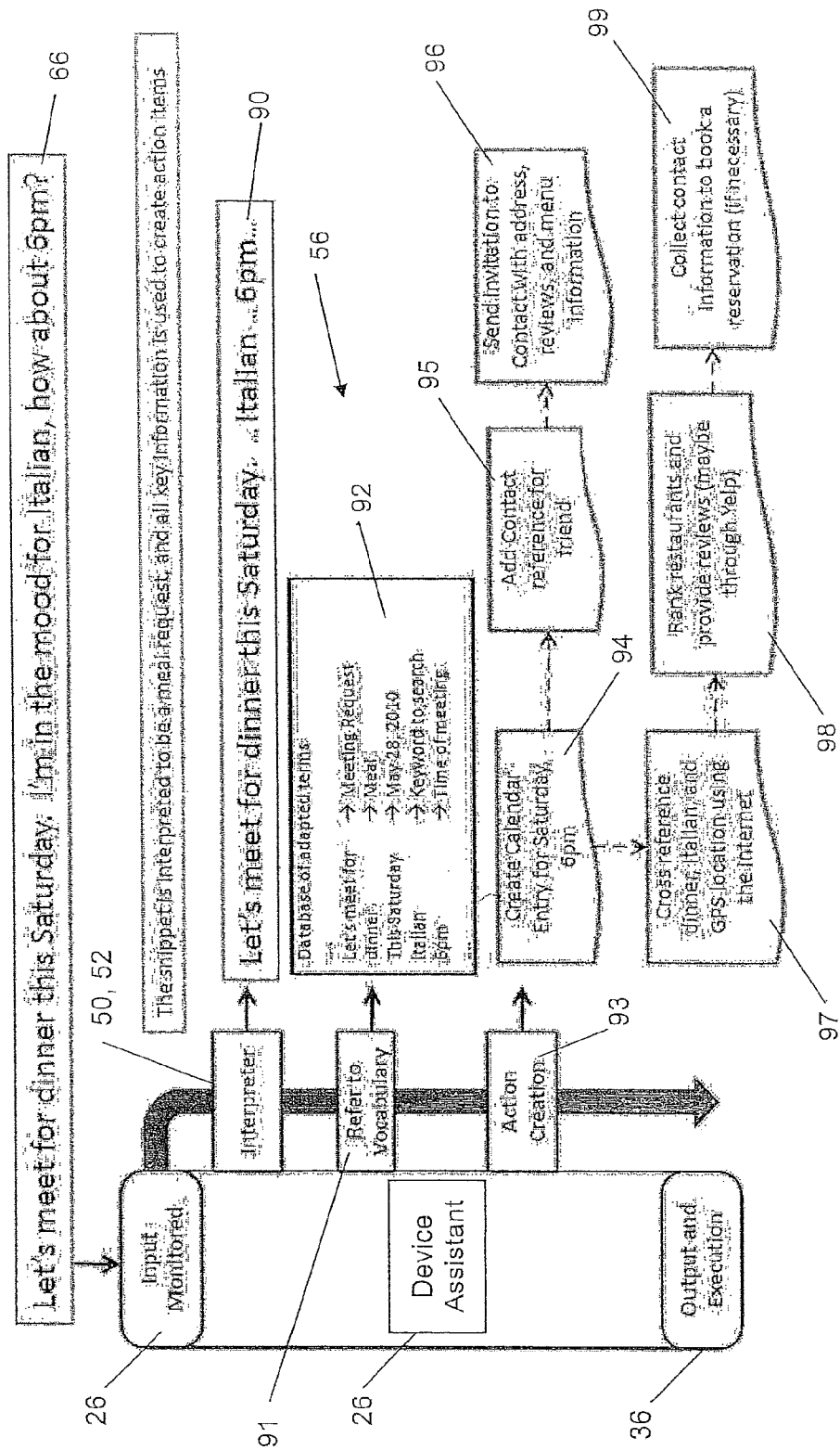
FIG. 6 is a flow diagram illustrating an example set of actions determined according to a monitored text or voice data.

FIG. 6 illustrates an example segment 66 obtained from voice data 42 or text data 44 that relates to arranging a dinner event. In this example, the segment 66 is obtained during a phone conversation, instant messaging conversation, or other ongoing communication, in order to preemptively determine (and execute) one or more actions 36 that the user may be expected to perform following the conversation or at least provides useful additional information that relates to the information detected in the segment 66. The voice or text interpreter 50, 52 detects, from the segment 66, portions 90 thereof that contain contextual information, which can be referenced at 91. For example, in this example, a database of adapted terms 92 can be referenced from the correlation and association database 56 to determine that the conversation relates to a meeting request ("Let's meet"), the meeting relates to a meal ("dinner"), the projected date is May 28, 2010 ("this Saturday"), the relevant time is 6 pm ("how about 6 pm?"), and a potential keyword is "Italian". The potential keyword can be used to identify a search term for finding related information.

In this example the relevant information (i.e. the items 26 listed above) can be correlated to actions 36 to be created at 93. Using the time and date information, a calendar entry 248 can be created at 94. In addition to the calendar entry 248, an address book or contact list can be referenced and if the caller or correspondent is not in the address book or contact list, a new contact can be added at 95 with the information at hand (e.g. phone number, name, instant messaging information, etc.). It may instead be determined that the caller or correspondent is already in the user's address book or contact list. If an email address or other address or identifier is known from the communication, an invitation can also be generated and sent to the caller or correspondent at 96. The invitation can include any additional information that the device assistant module 28 has gathered. For example, at 97, the keywords "dinner", "Italian", and the user's GPS location can be cross-referenced using a browser to find restaurant suggestions that are close by, directions, reviews, etc. at 98 and may collect information at 99 for booking a reservation. By gathering this information, generating a calendar entry, adding a contact (if necessary), and preparing an invitation, the device assistant module 28 can therefore preemptively perform actions 36 that the user may intend to do following the conversation and thus save time, remind them to do so, and enhance the user's productivity since the user at least does not need to access and initiate such tasks.

Figure 7:
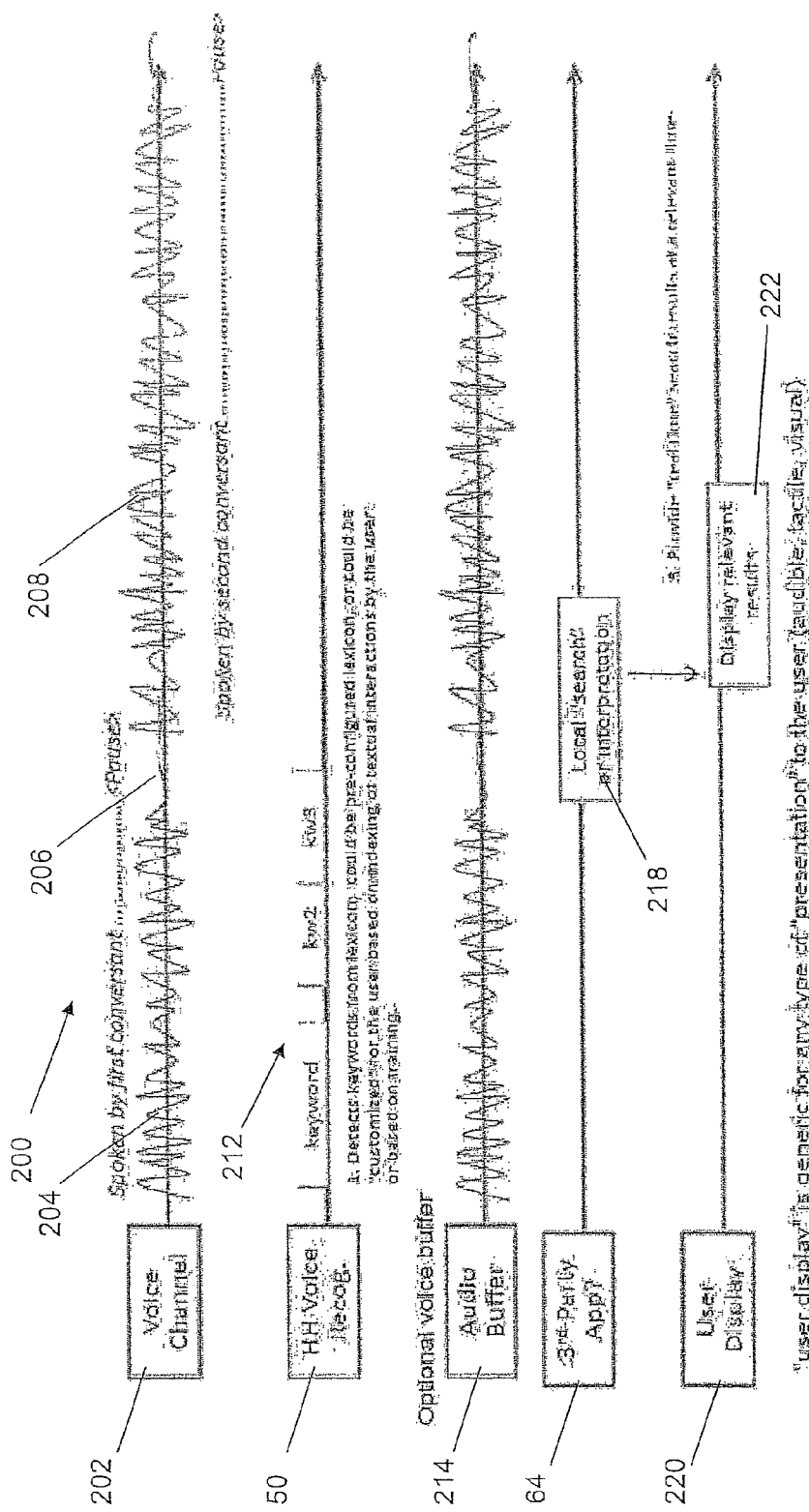
FIG. 7 illustrates an example voice-based monitoring.

FIG. 7 illustrates an example voice signal 200 detected on a voice channel 202. The voice signal 200 has a first portion 204 spoken by the first correspondent (i.e. the user of the mobile device 10 or the person to whom the user is speaking), a detectable pause 206 in the conversation, and a second portion 208 spoken by the second correspondent. The voice interpretation module 50 utilizes voice recognition methods to identify from the first portion 204, a series of keywords 212. In this example an audio buffer 24 may be used to store the voice signal 200, e.g. to assist in detecting keywords and/or enabling the device assistant module 28 to refer back to the voice signal 200 afterwards. In this example, a $3^{rd}$ party application 64 is provided with one or more of the keywords 212 to perform a local search or interpretation of the keywords at 218. A user display operation is then performed at 220 to at an appropriate time (e.g. upon receiving confirmation from user, detecting low interactivity, etc.) display the relevant results at 222.

Figure 8:
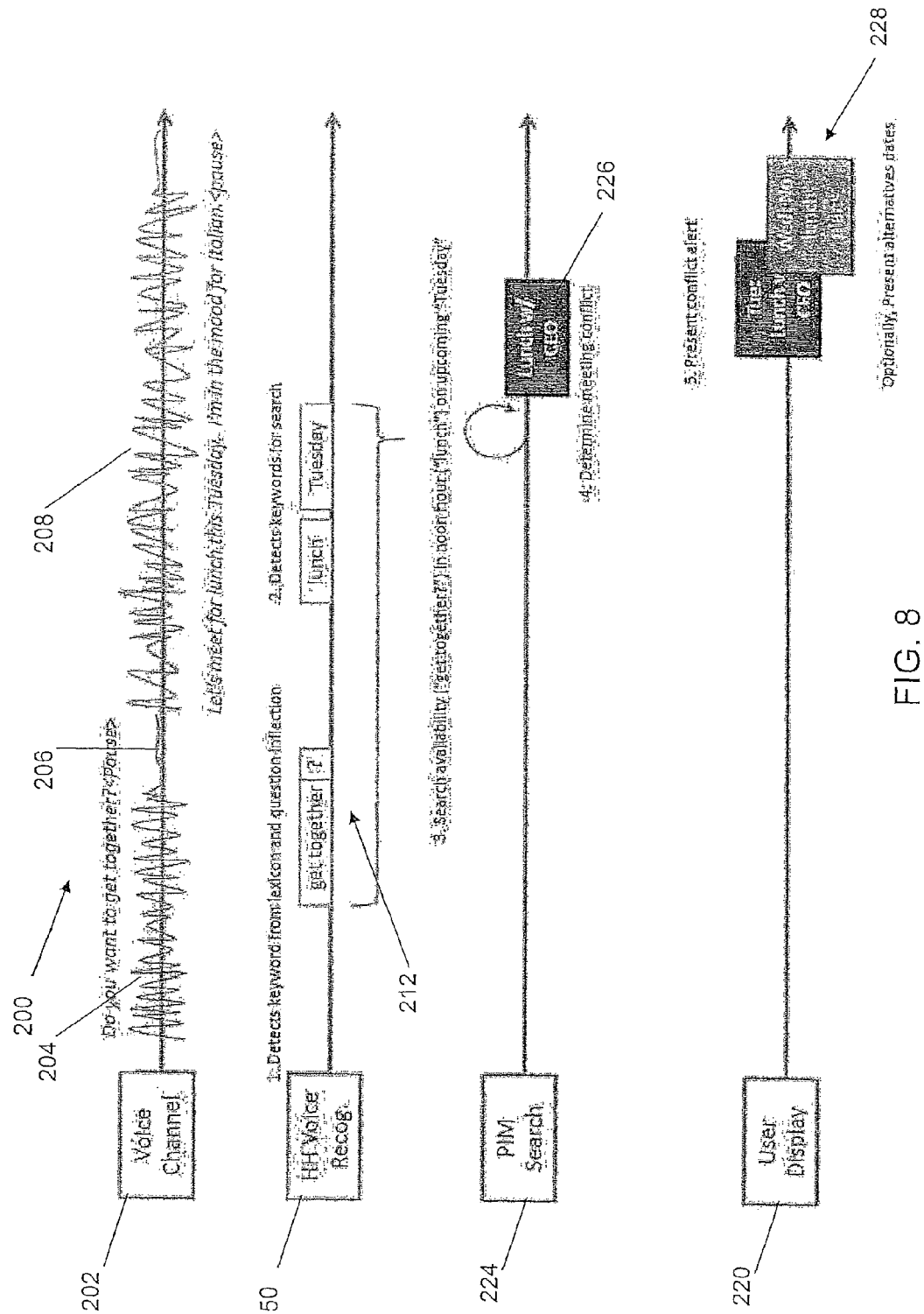
FIG. 8 illustrates another example voice-based monitoring.
Figure 9:
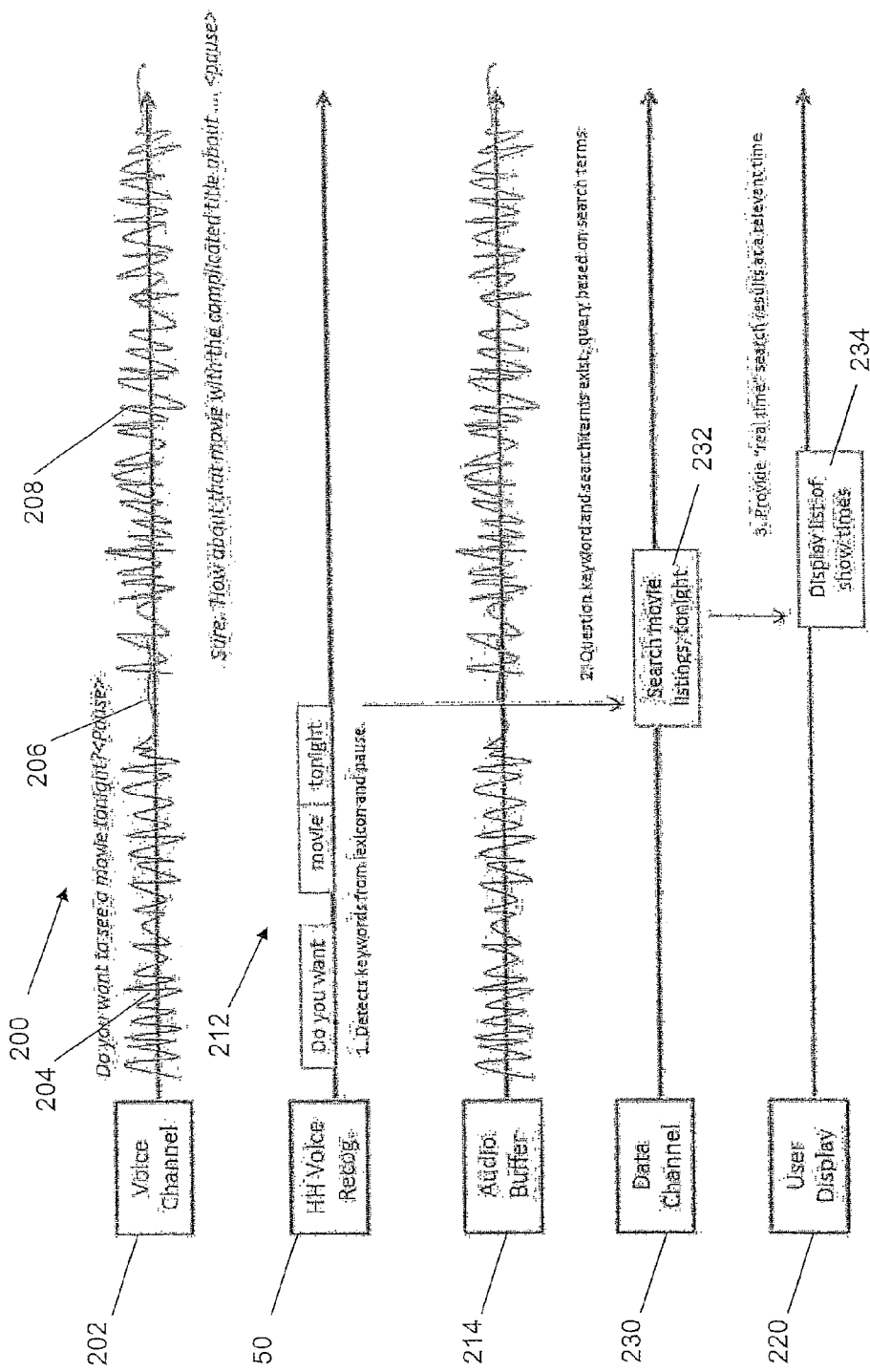
FIG. 9 illustrates yet another example voice-based monitoring.
Figure 10:
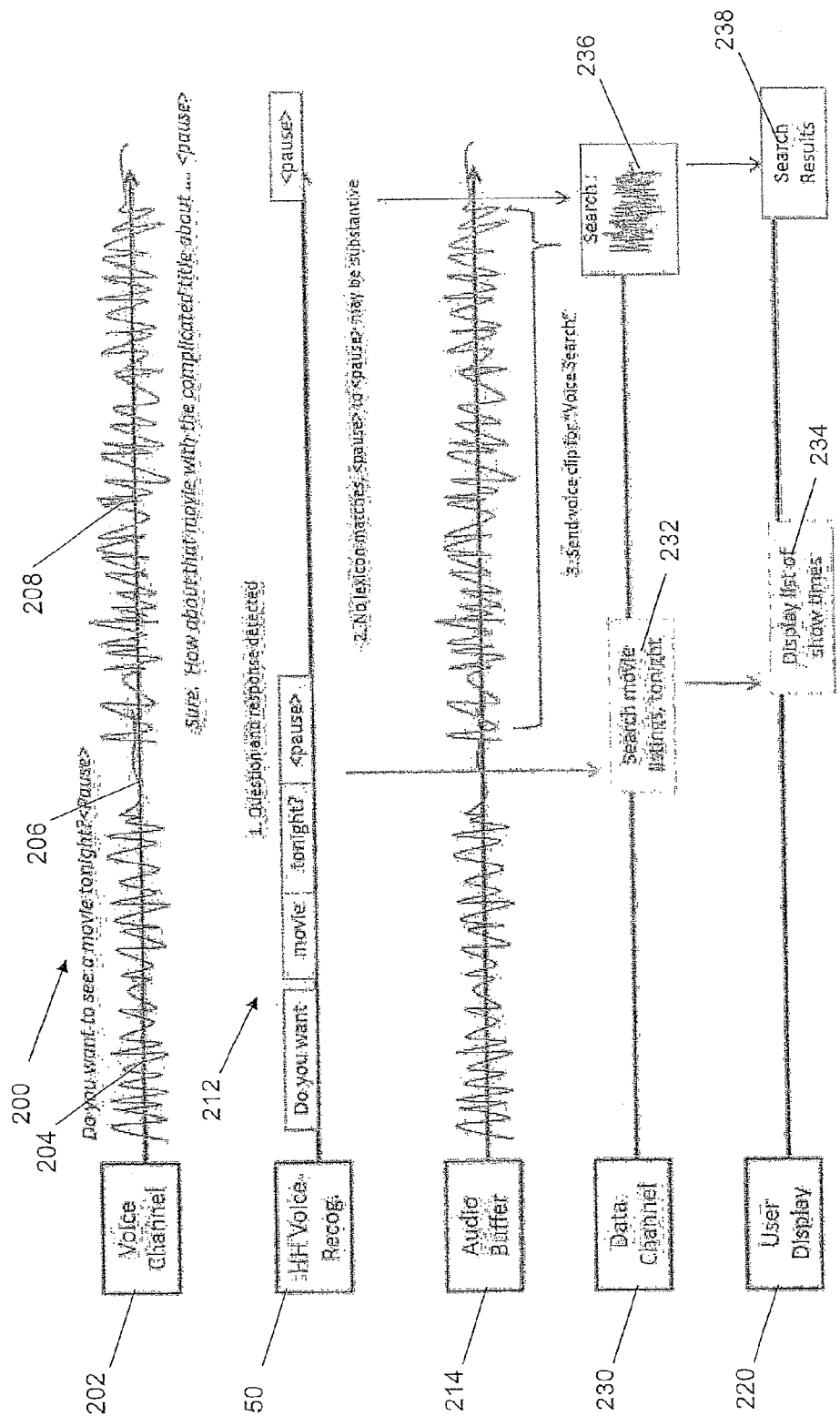
FIG. 10 illustrates yet another example voice-based monitoring.

FIGS. 8 to 10 illustrate further example voice signals 200. In FIG. 8, the keywords 212 also include a detected inflection indicating a question and includes keywords similar to those utilized in the example of FIG. 6. At 224, a personal information manager (PIM) is referenced, in this case to determine a meeting conflict at 226. The user display operation performed at 220 in this example thus presents a conflict alert at 228 and can present, for example, alternative dates. By providing such information preemptively as the user is conversing with the other correspondent, the conflict alert can enable the user to resolve the conflict while the user is in the conversation rather than requiring a follow up rescheduling request. This is particularly useful during voice conversations where it may be difficult to check a calendar application while on the phone. By determining the conflict preemptively, the user is provided with the relevant information when it is most usefully needed.

In the example shown in FIG. 9, the keywords 212 detected on the voice channel 202 can be used to run a search for movie listings on a data channel 230 at 232 thus enabling a list of show times to be displayed at 234. This also enables relevant information to be preemptively obtained while the user is conversing with another correspondent and thus avoids the need for a follow up conversation regarding which show to attend. This is particularly useful where the user is on the move or otherwise has difficulty looking up information while the user is on the phone.

The example shown in FIG. 10 illustrates that the device assistant module 28 may be operable to perform additional or more complex queries if a first attempt is not successful. For example, or this example, assuming that a first correspondent, Albert, is operating a mobile device 10 comprising a device assistant module 28, and a second correspondent, Betty, is on the other end of a call. The desired action 36 was detected in terms of a request to go see a movie. However, in this case, Betty's response yielded no matches at 232, 234 (shown greyed out) based on her particular response. This may be due to the complexity of the response, or the fact that the response was a description of the movie vs. the actual title (for example, "Sure, how about that new Will Ferrell movie?").

In the event that the voice interpreter 50 in this example cannot determine what was said, or make the correlation between the response and a movie, it would then perform a complex search, e.g. voice search 236 in this example. This may be done using a third party tool or any available application. The voice search 236 may involve taking the voice segment 200 and entering it into a voice search engine, and providing a set of search results 238.

For the example shown in FIG. 10 and explained above, it can be appreciated that when the methodology used may not always arrive at the desired results, such as a set of movie listings, however by understanding the partial intent (in this case, see a movie tonight), the search results from a third party search engine can attempt to find a correlation based on a third party search. For this example, entering "Will Ferrell" and "movie" into the voice search 236 may yield a variety of results at 238 which provide enough context to trigger a correlation that can be made by the user, based on possible correlations determined by the device assistant module 28.

As such, it can be appreciated that the device assistant module 28 can be operable to address situations wherein it cannot determine exactly what was said, by providing a response with suggestions based on the information it was already able to interpret, as well, results from a search query of what was said.

Figure 11:
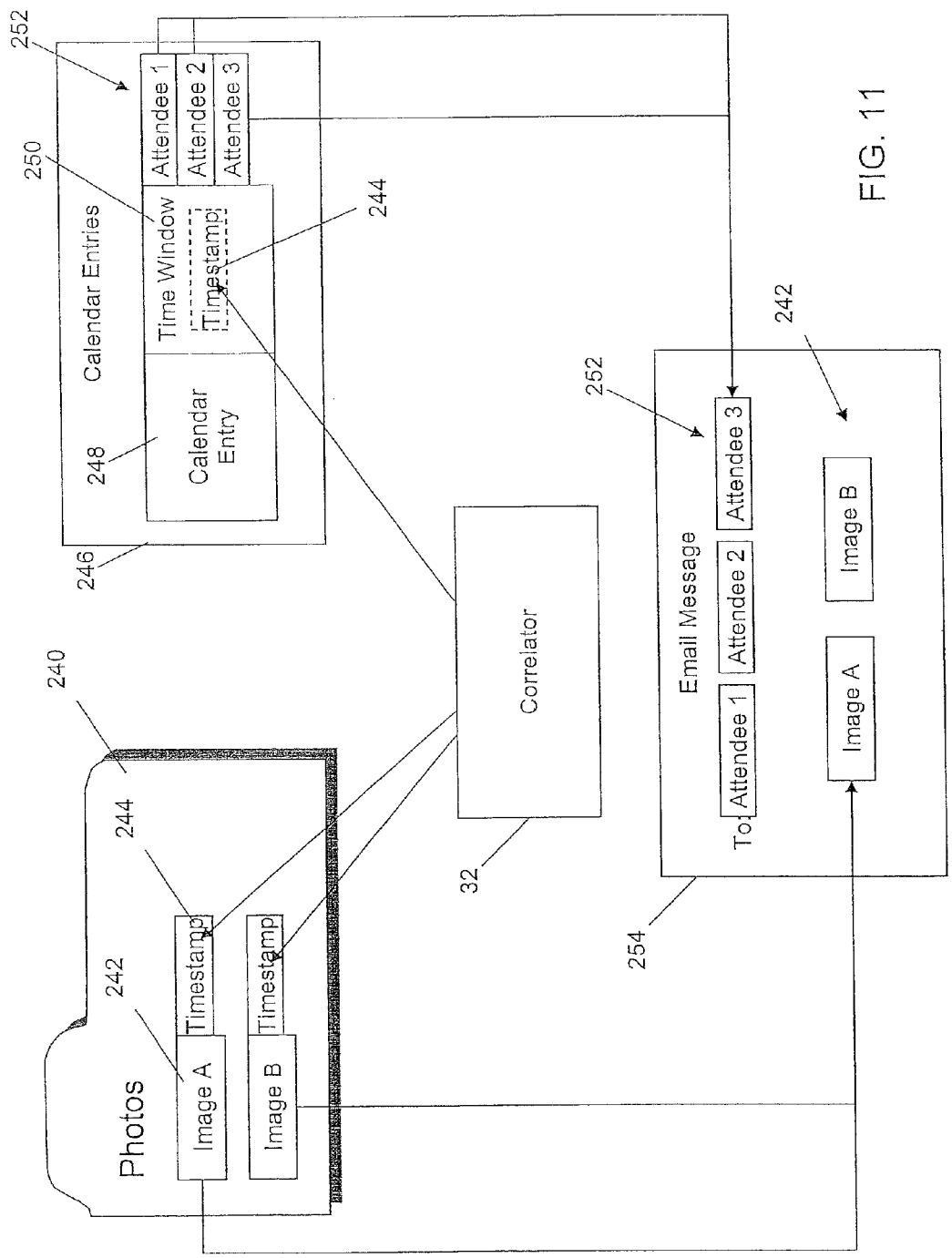
FIG. 11 illustrates an example correlation detection.

In addition to detecting segments 66 of a conversation in order to preemptively taken action, the device assistant module 28 can also correlate data on the mobile device 10 and initiate an associated action 36 based on a detected correlation as shown by way of example only in FIG. 11. In the example shown in FIG. 11, the object correlator 32 correlates a pair of images 242 in a photos folder 240 with a set of attendees 252 for a particular calendar entry 248, based on time. The images 242 include timestamps 244 that fall within a time window 250 associated with the particular calendar entry 248 in a calendar application's calendar entries 246. The correlation suggests that the images 242 captures within the time window 250 may be relevant to the meeting or gathering associated with the calendar entry 248 and thus may be of interest to the other attendees 252.

For example, photos taken during a meeting or during a social event may be of interest to the user's co-workers and friends respectively. Therefore, the device assistant module 28 can preemptively make such a correlation, for example, immediately following the expiration of the time window 250 to enable the user to quickly share information that the user may forget to share at a later time without provocation. In this example, the correlation is associated with a follow-up email message 254 that attaches the images 242 and addresses the email message 254 to the attendees 252. By prompting the user with the pre-arranged communication, the user can edit the message 254 and confirm that the user does in fact wish to send the images 242 to the specified attendees 252.

In some example embodiments, the prompt can provide a message preview rather than generating the actual email message 254 whereupon confirming the desire to send the email message 254 the email message 254 can be created. It can therefore be appreciated that the device assistant module 28 can not only detect new items 26, e.g. by monitoring voice and data channels 202, 230, but also actively seeking out correlations between data or the existence of new data according to predetermined logic. As such, the monitored items 26 may include any data, information, trigger, event, input, output or other interaction detectable on the mobile device 10.

Figure 12:
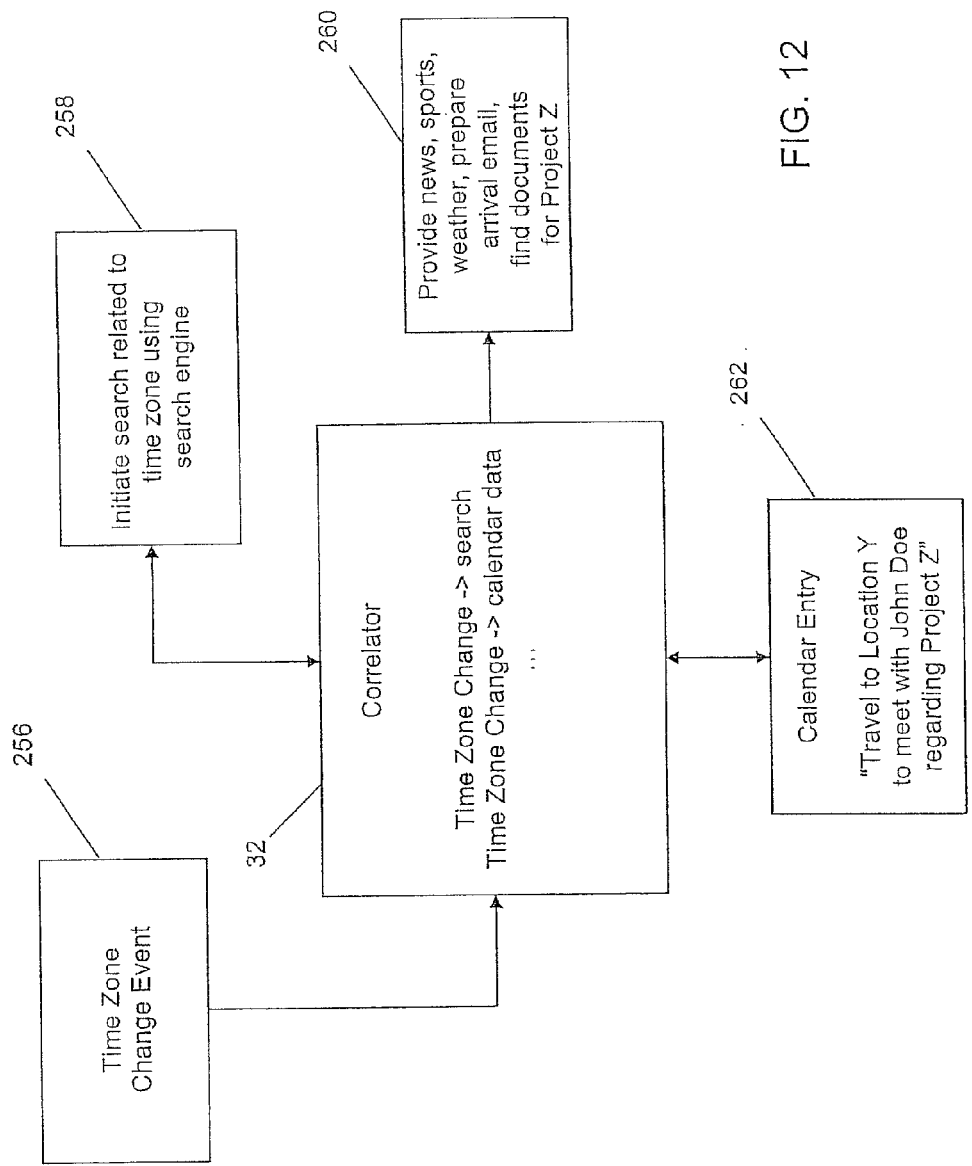
FIG. 12 illustrates another example correlation detection.

In addition to detecting items 26 from communications and identifying correlations between data, the device assistant module 28 may also initiate an action based on a single piece of data or event as shown in FIG. 12. In the example shown in FIG. 12, the correlator 32 detects a time zone change event 256 and immediately associates the event 256 with an action 36, namely to initiate a search related to the time zone using a search engine (e.g. via a browser) at 258. In addition to the immediate association, the detection of the time zone change event 256 can also trigger the correlator 32 to find other items 26 to correlate therewith. In this example, a particular calendar entry is found at 262, which indicates that the user is meant to be meeting at Location Y with John Doe regarding Project Z. To preemptively assist the user in preparing for this meeting, in addition to searching for potentially relevant information related to the time zone (e.g. news, sports, weather, etc.), the device assistant module 28 may prepare an arrival email to send to John Doe, and find documents on the mobile device 10 that relate to Project Z. In this way, the user can immediately notify John Doe of their arrival without having to initiate an arrival email and can be given access to potentially relevant information that allows them to prepare for the meeting regarding Project Z. It can therefore be appreciated that various associations and correlations may be performed either alone or in parallel in order to provide the user with a useful "head start" based on data detectable on the mobile device 10.

Figures 13, 14:
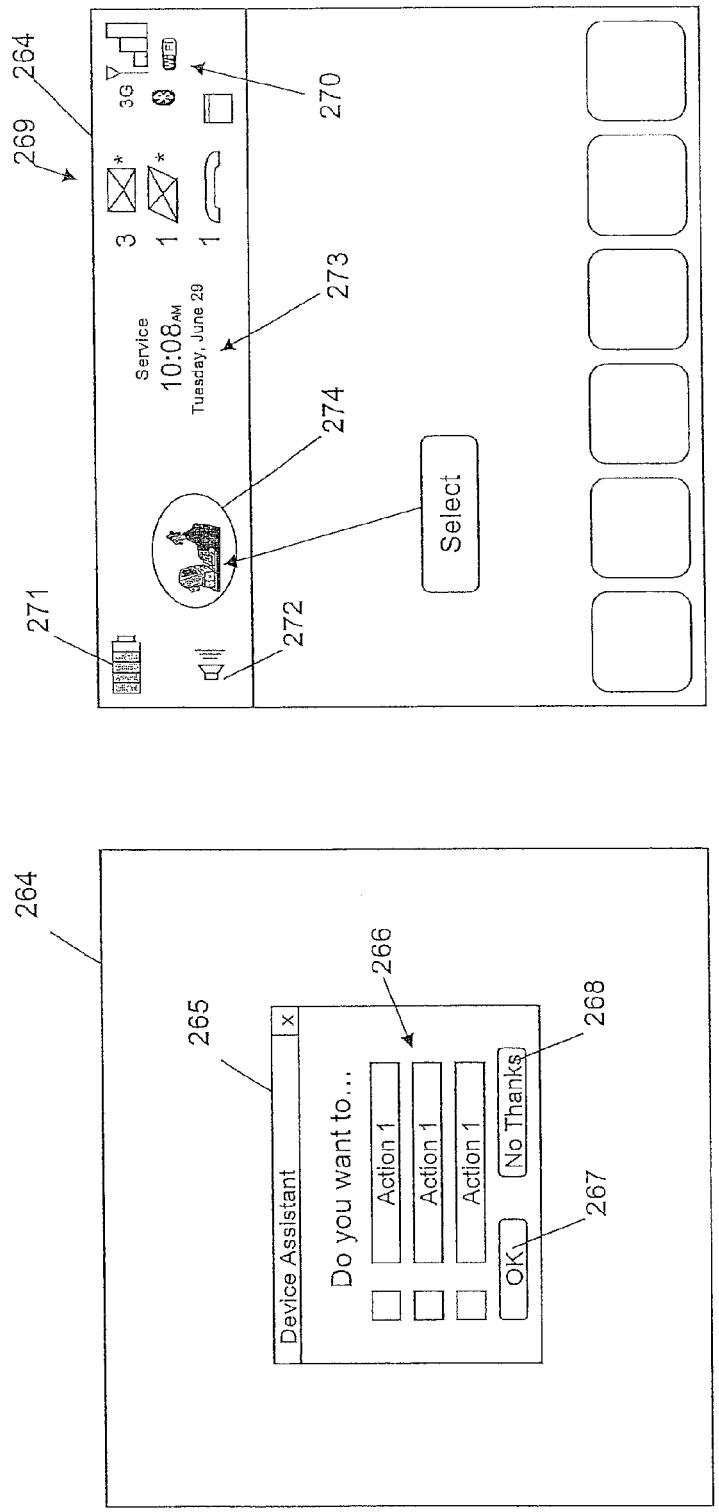
FIG. 13 is screen shot of an example user interface for prompting a user to confirm initiation of a set of actions.
FIG. 14 is a screen shot of an example user interface for providing a ribbon-based notification for a set of pending actions.

As discussed above, the user may be prompted prior to executing or providing an indication of the actions 36. FIG. 13 illustrates an example prompt UI (user interface) 265 displayed on a mobile device screen 264, which lists a series of action selectors 266, which may be selectable, e.g., using corresponding check boxes as shown. By providing the prompt UI 265, the user can confirm that the user wishes to have certain actions 36 taken by selecting one or more of the selectors 266 and confirming the selections by pressing an OK button 267, or decline execution of the actions 36 by selecting a No Thanks button 268. The selectors 266 enable the user to selectively confirm or decline specific ones of the actions 36 so that the user has full control over what actions 36 are performed.

It can be appreciated that in some example embodiments the user may not wish to be prompted for certain actions 36 (or at all) using the prompt UI. Turning now to FIG. 14, an assistant icon 274 can be displayed in the ribbon 264 along with other items such as the battery level 271, profile 272, messages 269, time/date information 273, and radio/connections indicators 270 displayed on the mobile device screen. By providing the selectable assistant icon 274 rather than the prompt UI 265, the user can be given control over when to launch the device assistant module 28. The device assistant module 28 may therefore cache pending actions 36 in the action results cache 58 or other memory until the user calls the device assistant module 28 by selecting the assistant icon 274 from the ribbon 264. In some example embodiments, the prompt UI 265 can be initiated upon detecting selection of the assistant icon 274 with the list of selectors 266 corresponding to various actions 36 that have been queued for the user to confirm or decline.

It can also be appreciated that the user may wish to define certain actions 36 that are always performed automatically, actions 36 that are never performed, and those that require a prompt. Such definitions can be user selectable by providing a user preference screen or menu (not shown) to build a user profile. In addition to user profiles, profiles can be predetermined or built over time for various contacts, applications, and actions 36. In this way, the device assistant module 28 can intelligently adapt to the user's needs and tailor its involvement over time according to how the user wishes to utilize its operations. Any suitable artificial intelligence (e.g. using fuzzy logic or other reasoning-based methods) can be used to build and adapt profiles over time. User feedback can also contribute to the generation of profiles, e.g. by requesting from the user, in the prompt 265, whether or not to always perform the specified task, never perform this task, always/never for the particular application, always/never for the particular contact, etc. In this way, the correlation and association database 56 can record instructions based on each feedback response in order to preemptively take actions 36 that were previously prompted in future uses.

Figure 15:
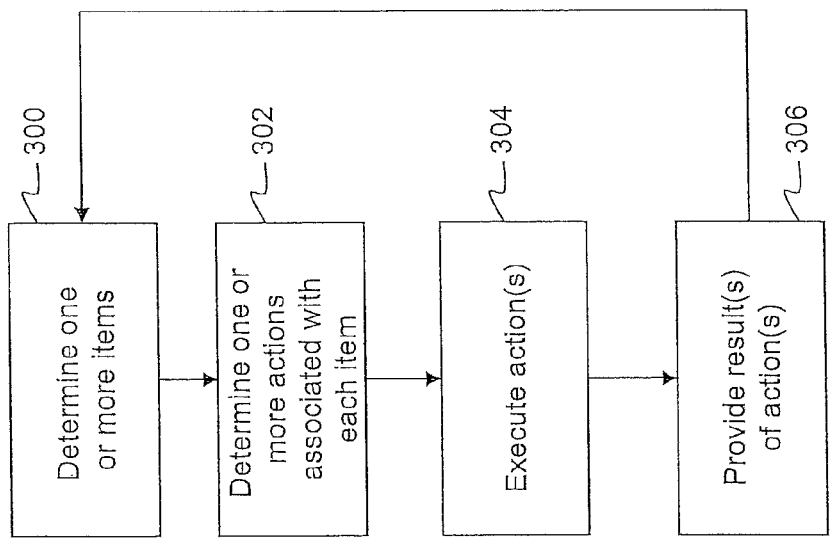
FIG. 15 is a flow chart illustrating an example set of computer-executable instructions for monitoring items on a mobile communication device and determining associated actions.

Turning now to FIG. 15, an example set of computer executable instructions is shown that may be executed by the device assistant module 28. At 300, the device assistant module 28 determines one or more items 26, e.g. by detecting such items, by being notified of such items, by initiating an examination of data on the device to find correlations, etc. The device assistant module 28 then determines one or more actions 36 that are associated with the items 26 at 302. As discussed in greater detail herein, this may include extracting data from the items 26, determining an associated action with a detected event, correlating information associated with distinct items 26, etc. The actions 36 may then be executed at 304, and the results of the actions 36 provided at 306. It can be appreciated that the example set of instructions shown in FIG. 15 assumes automatic execution of the actions 36 and subsequent provision of the results of the actions 36.

Figure 16:
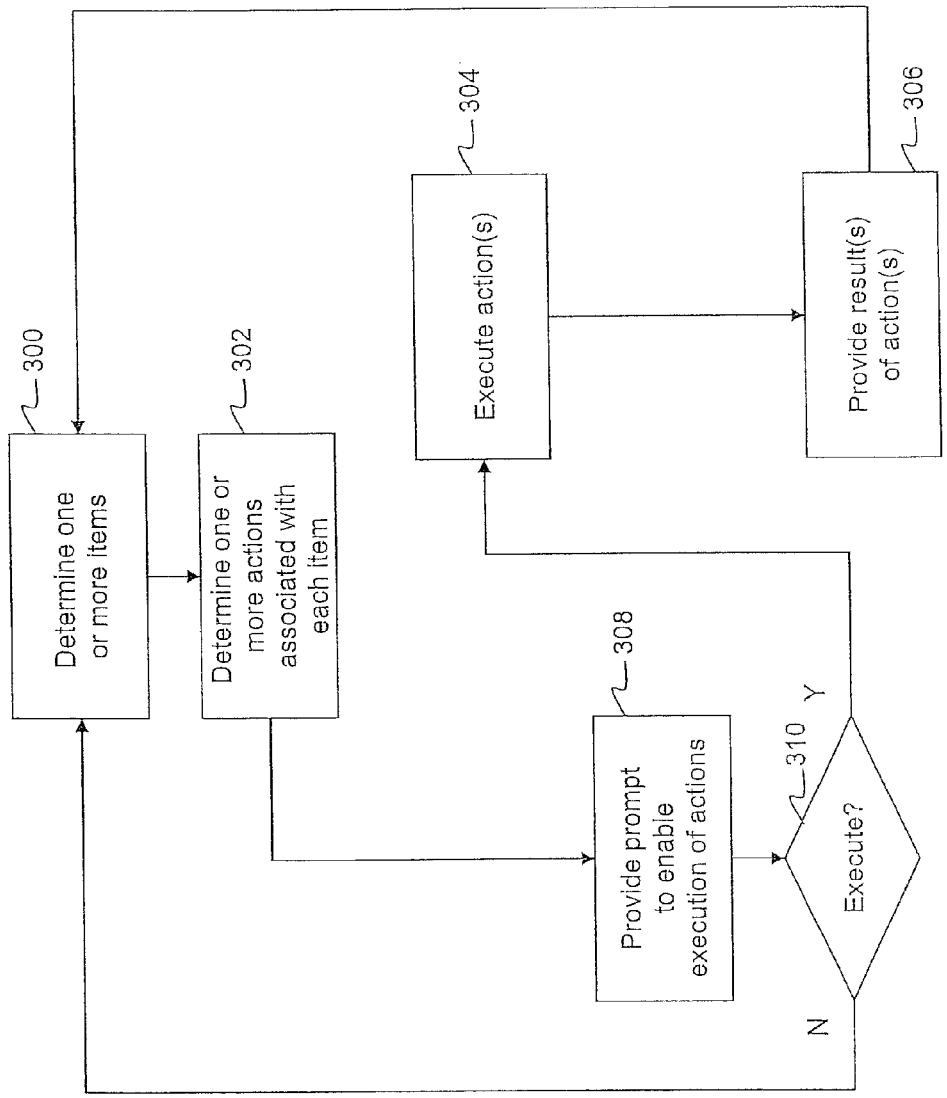
FIG. 16 is a flow chart illustrating another example set of computer-executable instructions for monitoring items on a mobile communication device and determining associated actions.

As discussed above, a prompt may be used to allow the user to initiate or confirm execution and/or provision of the results of the actions 36, e.g. using the prompt UI 265 or assistant icon 274 (or both). A first example set of instructions utilizing a prompt is shown in FIG. 16. In this example, the prompt is provided at 308 prior to execution of the actions 36 at 304. If the user declines to initiate the actions 36 at 310, the method returns to 300. If the user confirms or otherwise accepts at least one action 36 at 310, the accepted action or actions 36 is/are executed at 304 and the results provide at 306 as above.

Figure 17:
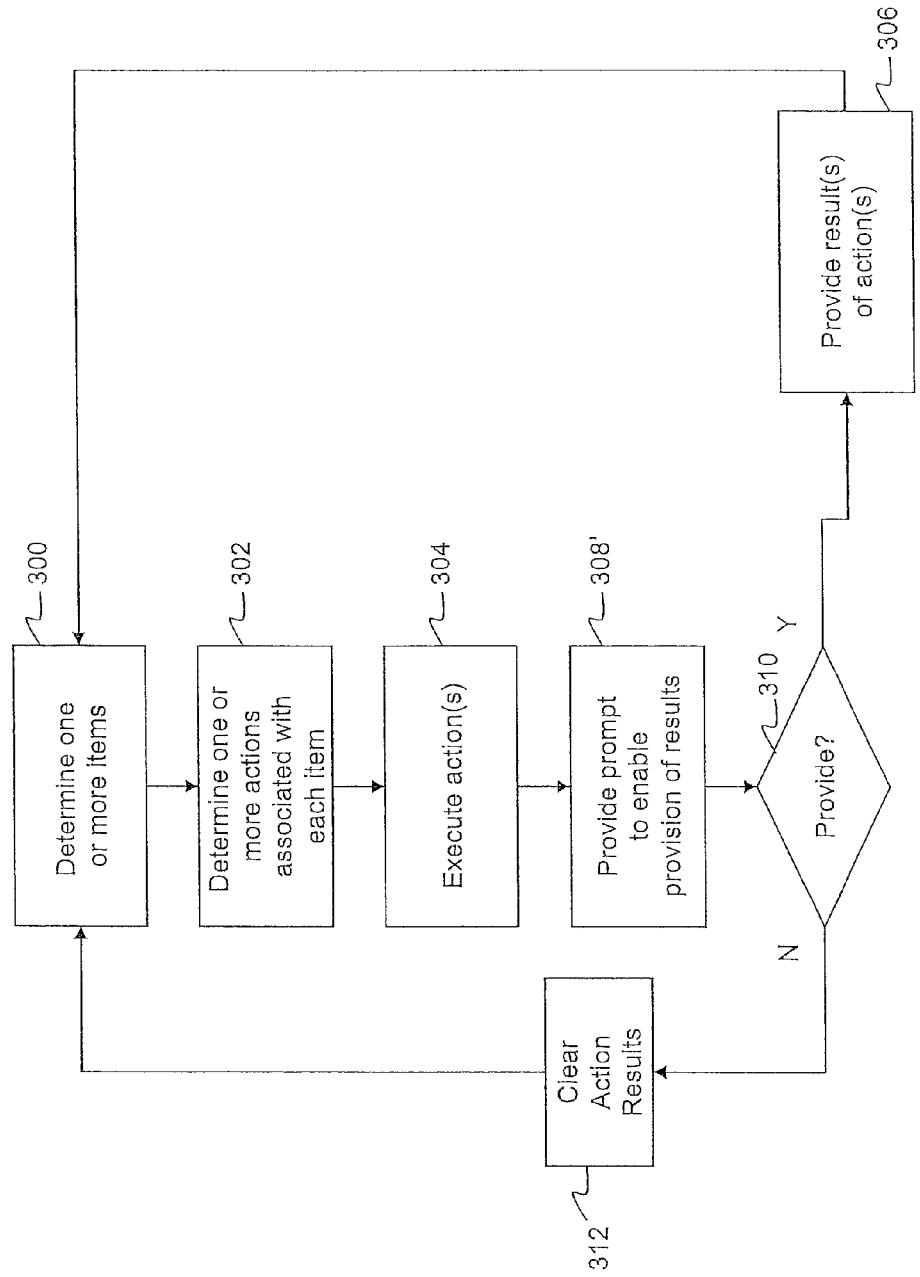
FIG. 17 is a flow chart illustrating yet another example set of computer-executable instructions for monitoring items on a mobile communication device and determining associated actions.

In some example embodiments, rather than delay execution of the actions 36 until after providing the prompt, the device assistant module 28 may operate by preemptively executing one or more of the actions 36 prior to (or while displaying) the prompt and delay providing the results of the actions 36 until after receiving confirmation from the user as shown in FIG. 17. In this way, the device assistant module 28 can provide the results of the actions 36 more quickly while still avoiding the potential disruption of simply providing the results of the actions 36 without the user's consent. In FIG. 17, it can be seen that the actions 36 are executed at 304 and the prompt provided at 308'. Operation 308' in this example would include caching at least some information related to the results (e.g. a web-page to be launched in the browser, a link to a folder containing items, a draft email, etc.) in the action results cache 58. In such example embodiments, if the device assistant module 28 detects that the results are not to be provided at 310 (i.e. the user declines at least one result of the actions 36), the associated actions 36 are cleared from the action results cache 58 at 312. If at least one action 36 is accepted at 310, the result or results of the one or more actions 36 is/are provided at 306. It can therefore be appreciated from FIGS. 15 to 17 that the interpretation of the items 26, the determination of the actions 36, the execution of the actions 36, and the provision of the results of the actions 36 may be performed in various sequences according to user preferences and according to different applications.

Figure 18:
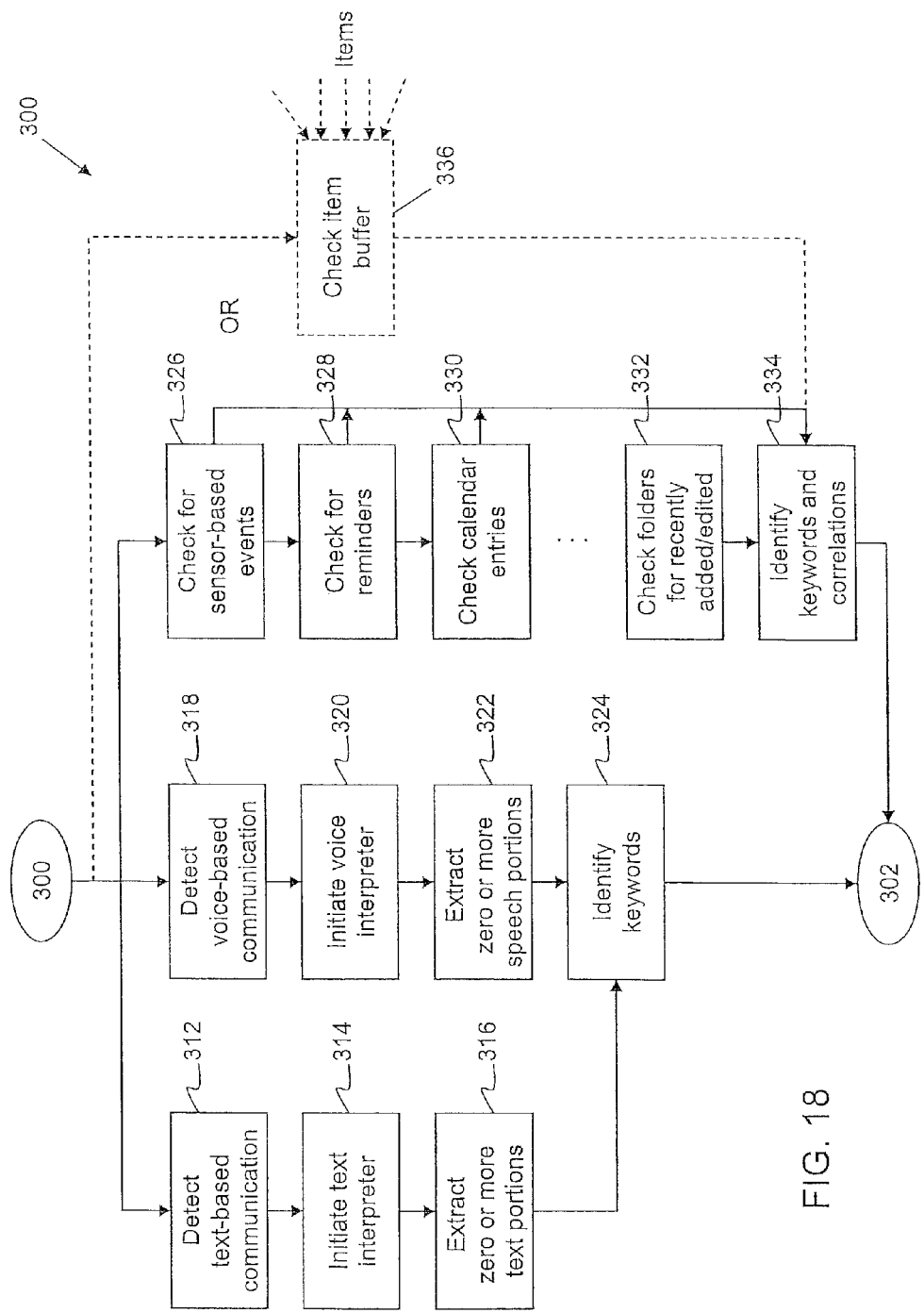
FIG. 18 is a flow chart illustrating an example set of computer-executable instructions for determining one or more items that may have associated actions.

An example set of instructions for determining the one or more items at 300 is shown in FIG. 18. In FIG. 18, it can be seen that the one or more items 26 may originate from various sources. At 312, a text-based communication is detected and the text interpretation module 52 initiated at 314 to extract zero or more text portions at 316 (e.g. keywords identified in segments 66) as discussed above. Similarly, a voice-based communication may be detected at 318 to initiate the voice interpretation module 50 at 320 and in turn extract zero or more speech portions at 322 (e.g. keywords from a segment 66 as discussed above). The zero or more text portions and zero or more speech portions in this example amounts to one or more keywords 212 that are identified at 324. As discussed above, for voice and text-based communications, such keywords 212 can be used to find associated actions 36.

In addition to the communication based detections, the device assistant module 28 may also check for sensor-based events at 326, check for reminders at 328, check for calendar entries at 330, check folders for recently added or edited items at 332, etc. It can be appreciated from FIG. 18 that the operations in 326 to 332 are only illustrative based on the examples provided above and various other checks may be performed instead or in addition to those shown. The non-communication based items determined in 326 through 332 are provided as keywords or correlations that can be associated with actions 36 at 334. FIG. 18 also shows, in dashed lines, another example embodiment, wherein rather than (or in addition to) actively determining non-communication based items 26, the device assistant module 28 may check an item buffer (not shown) at 336. In such example embodiments, various applications, sub-systems and sensors can be programmed or otherwise operable to report potential items to the item buffer to streamline the determination of the monitored items 26. As such, it can be appreciated that the monitored items 26 may be pushed to the device assistant module 28 as well as being pulled thereby.

The keywords identified at 324 and the keywords and correlations identified at 334 are now available to the device assistant module 28 for performing operation 302. An example set of instructions for performing operation 302 from FIGS. 15 to 17 is shown in FIG. 19.

Figure 19:
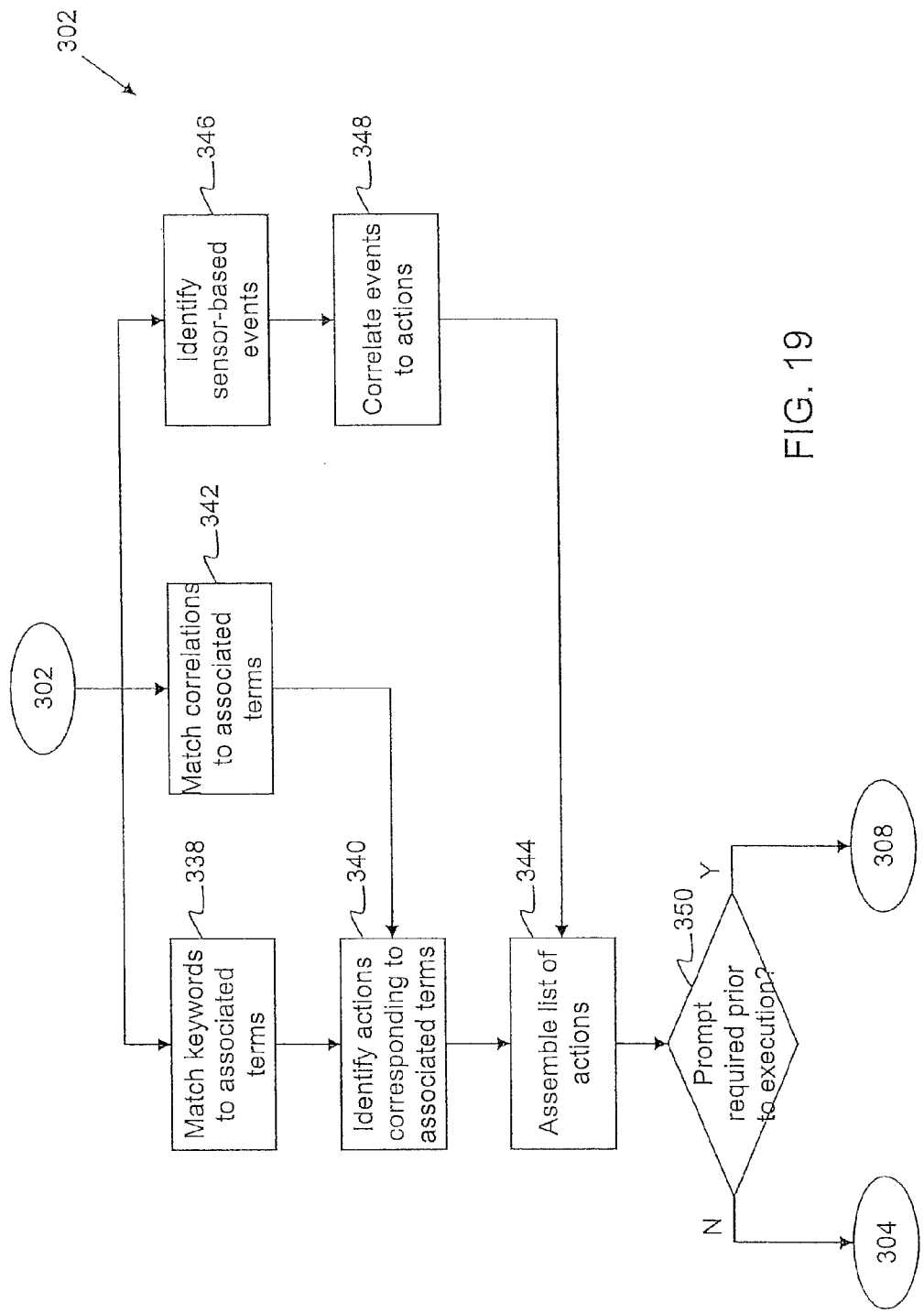
FIG. 19 is a flow chart illustrating an example set of computer-executable instructions for determining one or more actions associated with one or more corresponding items.

FIG. 19 assumes that keywords, correlations, and event are provided in order to illustrate this example. At 338, the keywords are matched to associated terms (e.g. "Let's meet" matched to "meeting request"). Similarly, correlations may be matches to associated terms at 342 (e.g. "image saved during meeting" matched to "send image to other attendee(s)). The actions 36 corresponding to the associated terms are then identified at 340. For example, the associated term "meeting request" may correspond to a new calendar entry and/or a meeting invitation. Similarly, sending an image to an attendee may initiate a new email message, new MMS message, etc.

Sensor-based events are identified at 346 and are correlated to actions 36 directly at 348 or to other items (at 342), e.g. as shown in FIG. 12. For example, detecting a change in time zone may correlate directly to a search for information related to the time zone while at the same time initiate a check for related calendar entries 248 at 342. Therefore, it can be appreciated that the separation between 338, 342, and 346 in FIG. 19 is purely for illustrative purposes and overlap or cross-correlations may also be performed in order to assemble the list of actions 36 at 344.

Upon assembling the actions 36 at 344, the device assistant module 28 determines at 350 whether or not a prompt is required prior to executing the actions 36. If not, the process continues to operation 304 (e.g. according to the example embodiments shown in FIGS. 15 and 17). If a prompt is required, the process continues to operation 308 (e.g. according to the example embodiment shown in FIG. 16).

Figure 20:
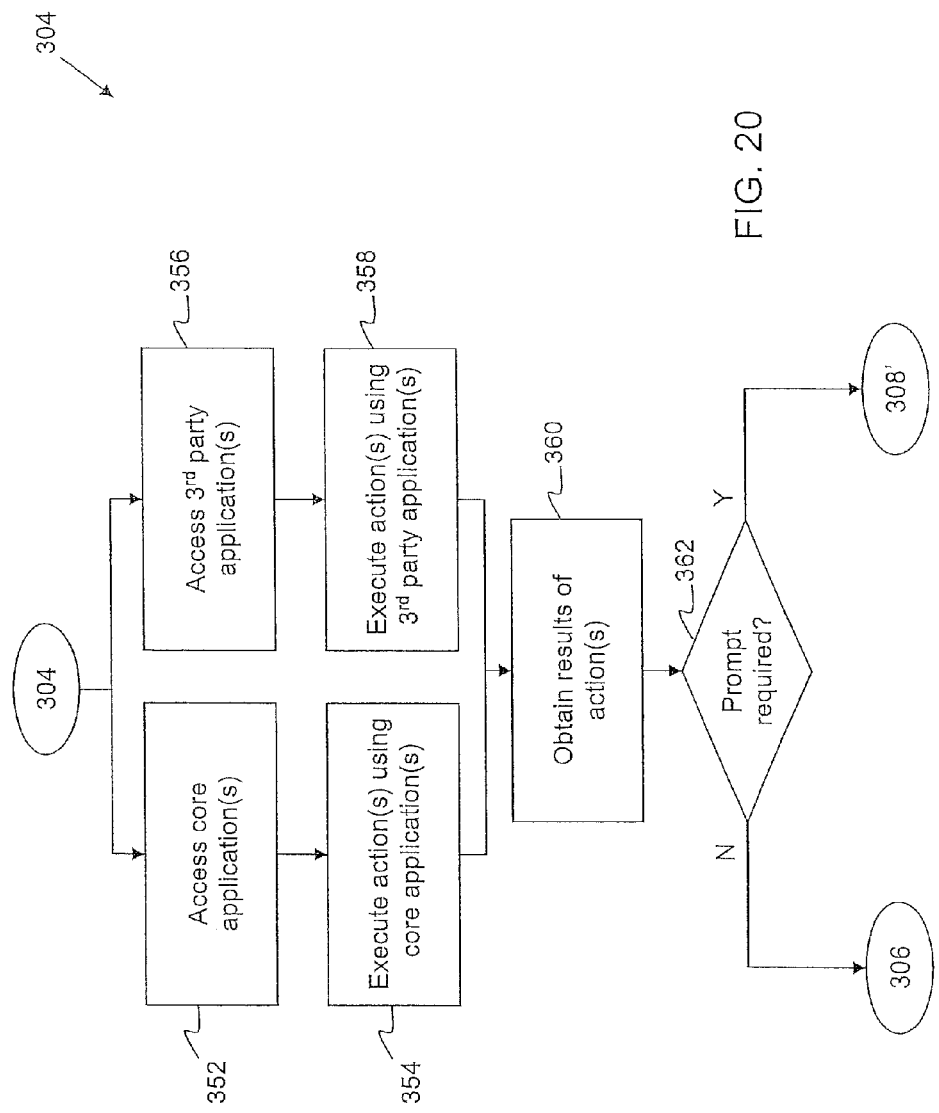
FIG. 20 is a flow chart illustrating an example set of computer-executable instructions for executing one more actions associated with one or more corresponding items.

An example set of instructions for performing operation 304 is shown in FIG. 20. Once the actions 36 have been determined and, if required, confirmation obtained from the user, any applicable core applications 62 are accessed at 352 and the actions 36 requiring the core applications 62 executed at 354. For example, a calendar application may be accessed in order to generate a meeting invite, an email application may be accessed to generate a new email, a browser may be accessed to perform a search, etc. Similarly, if $3^{rd}$ party applications 64 are required, they are accessed at 356 and the actions 36 that use such $3^{rd}$ party applications 64 are executed at 358. The results of the actions 36 are then obtained at 360.

The device assistant module 28 then determines in this example at 362, whether or not the prompt is now required (e.g. according to the example embodiment shown in FIGS. 17). If so, operation 308' is performed. If a prompt is not required at this item (e.g. has already been provided or is not required at all), the process continues to operation 306 (e.g. according to the example embodiments shown in FIGS. 15 and 16).

It can therefore be appreciated that the core and $3^{rd}$ party applications 62, 64 can be operated in the background or upon receiving confirmation to execute one or more actions 36 from the user in order to assist the user in performing actions 36 that the user may forget to do, may already be planning to do, and to eliminate at least some time in initiating such actions 36.

It can be seen therefore that the device assistant module 28 can be used to avoid several steps that the user may be intending to perform and/or identify operations and actions 36 that the user did not think of. Moreover, by avoiding the need to manually search for applications and submit the appropriate parameters, the device assistant module 28 can increase productivity and improve the user's experience. Accordingly, the device assistant module 28 can bring information to the user's attention automatically and preemptively and adapt to the user's and the mobile device's behaviors over time to continually enhance the assistance provided.

As such, there may be provided a method of controlling a mobile device, the method comprising: during use of the mobile device, determining one or more items, the items corresponding to data or events detectable on the mobile device; determining one or more actions associated with the one or more items, each action preemptively performing at least a portion of a task using features available on the mobile device; executing at least one of the one or more actions; and providing a result associated with the performance of the at least one action.

There may also be provided a computer readable storage medium comprising computer executable instructions for controlling a mobile device, the computer executable instructions comprising instructions for: during use of the mobile device, determining one or more items, the items corresponding to data or events detectable on the mobile device; determining one or more actions associated with the one or more items, each action preemptively performing at least a portion of a task using features available on the mobile device; executing at least one of the one or more actions; and providing a result associated with the performance of the at least one action.

There may also be provided a mobile device comprising a processor and memory, the memory comprising computer executable instructions for causing the processor to control the mobile device, the computer executable instructions comprising instructions for: during use of the mobile device, determining one or more items, the items corresponding to data or events detectable on the mobile device; determining one or more actions associated with the one or more items, each action preemptively performing at least a portion of a task using features available on the mobile device; executing at least one of the one or more actions; and providing a result associated with the performance of the at least one action.

Figure 21:
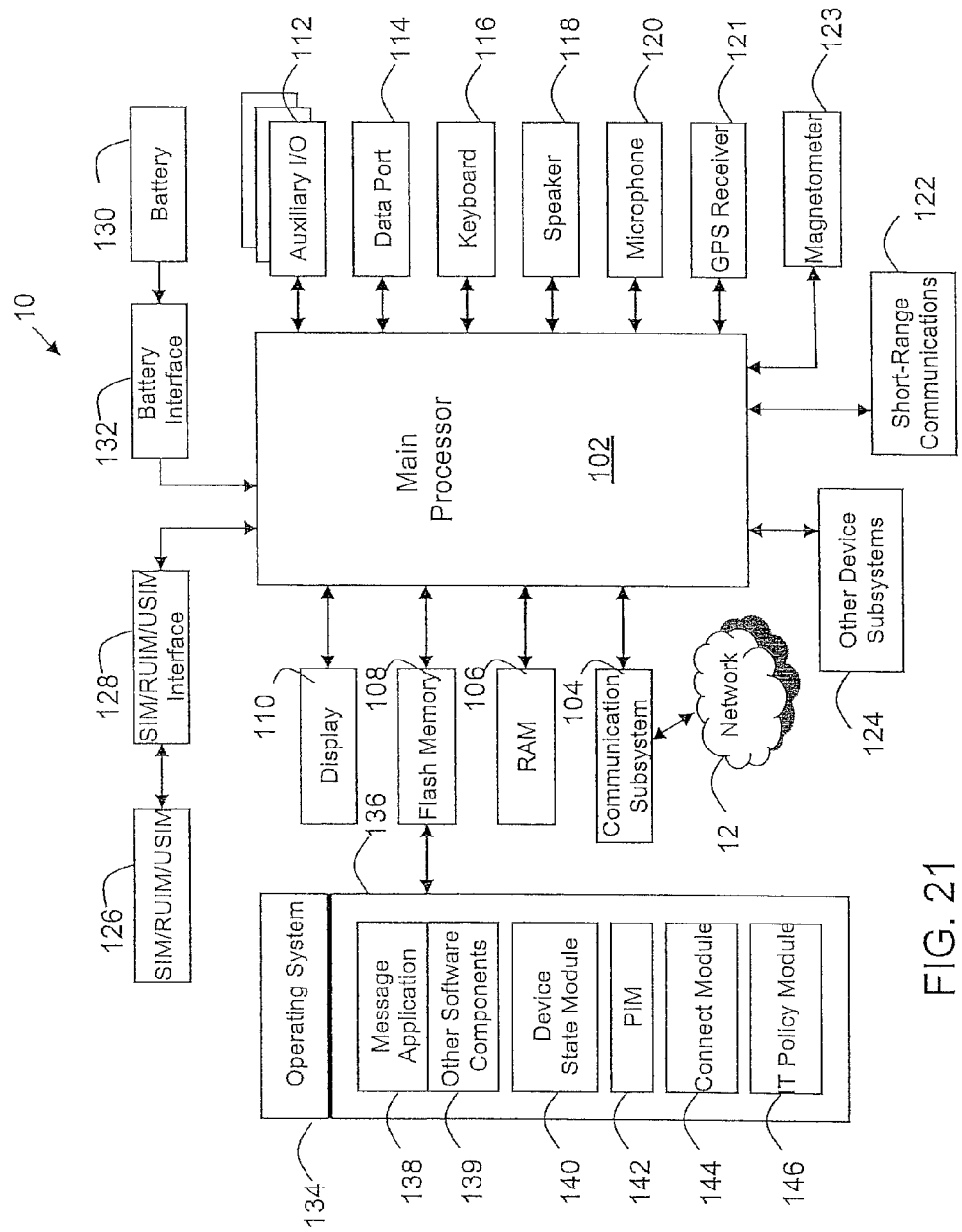
FIG. 21 is a block diagram of an example configuration for a mobile communication device.

Referring now to FIG. 21, shown therein is a block diagram of an example embodiment of a mobile device 10, which provides further detail thereof. The mobile device 10 includes a number of components such as a main processor 102 that controls the overall operation of the mobile device 10. Communication functions, including data and voice communications, are performed through a communication subsystem 104. The communication subsystem 104 receives messages from and sends messages to a wireless network 12. In this example embodiment of the mobile device 10, the communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by 3G and 4G networks such as EDGE, UMTS and HSDPA, LTE, Wi-Max etc. New standards are still being defined, but it is believed that they will have similarities to the network behaviour described herein, and it will also be understood by persons skilled in the art that the example embodiments described herein are intended to use any other suitable standards that are developed in the future. The wireless link connecting the communication subsystem 104 with the wireless network 12 represents one or more different Radio Frequency (RF) channels, operating according to defined protocols specified for GSM/GPRS communications. With newer network protocols, these channels are capable of supporting both circuit switched voice communications and packet switched data communications.

The main processor 102 also interacts with additional subsystems such as a Random Access Memory (RAM) 106, a flash memory 108, a display 110, an auxiliary input/output (I/O) subsystem 112, a data port 114, a keyboard 116, a speaker 118, a microphone 120, GPS receiver 121, magnetometer 123, short-range communications 122, and other device subsystems 124.

Some of the subsystems of the mobile device 10 perform communication-related functions, whereas other subsystems may provide "resident" or on-device functions. By way of example, the display 110 and the keyboard 116 may be used for both communication-related functions, such as entering a text message for transmission over the network 150, and device-resident functions such as a calculator or task list.

The mobile device 10 can send and receive communication signals over the wireless network 12 after required network registration or activation procedures have been completed. Network access is associated with a subscriber or user of the mobile device 10. To identify a subscriber, the mobile device 10 may use a subscriber module. Examples of such subscriber modules include a Subscriber Identity Module (SIM) developed for GSM networks, a Removable User Identity Module (RUIM) developed for CDMA networks and a Universal Subscriber Identity Module (USIM) developed for 3G networks such as UMTS. In the example shown, a SIM/RUIM/USIM 126 is to be inserted into a SIM/RUIM/USIM interface 128 in order to communicate with a network. The SIM/RUIM/USIM component 126 is one type of a conventional "smart card" that can be used to identify a subscriber of the mobile device 10 and to personalize the mobile device 10, among other things. Without the component 126, the mobile device 10 may not be fully operational for communication with the wireless network 12. By inserting the SIM/RUIM/USIM 126 into the SIM/RUIM/USIM interface 128, a subscriber can access all subscribed services. Services may include: web browsing and messaging such as e-mail, voice mail, SMS, and MMS. More advanced services may include: point of sale, field service and sales force automation. The SIM/RUIM/USIM 126 includes a processor and memory for storing information. Once the SIM/RUIM/USIM 126 is inserted into the SIM/RUIM/USIM interface 128, it is coupled to the main processor 102. In order to identify the subscriber, the SIM/RUIM/USIM 126 can include some user parameters such as an International Mobile Subscriber Identity (IMSI). An advantage of using the SIM/RUIM/USIM 126 is that a subscriber is not necessarily bound by any single physical mobile device. The SIM/RUIM/USIM 126 may store additional subscriber information for a mobile device as well, including datebook (or calendar) information and recent call information. Alternatively, user identification information can also be programmed into the flash memory 108.

The mobile device 10 is typically a battery-powered device and may include a battery interface 132 for receiving one or more batteries 130 (typically rechargeable). In at least some example embodiments, the battery 130 can be a smart battery with an embedded microprocessor. The battery interface 132 is coupled to a regulator (not shown), which assists the battery 130 in providing power V+ to the mobile device 10. Although current technology makes use of a battery, future technologies such as micro fuel cells may provide the power to the mobile device 10.

The mobile device 10 also includes an operating system (OS) 134 and software components 136 to 146. The operating system 134 and the software components 136 to 146 that are executed by the main processor 102 are typically stored in a persistent store such as the flash memory 108, which may alternatively be a read-only memory (ROM) or similar storage element (not shown). Those skilled in the art will appreciate that portions of the operating system 134 and the software components 136 to 146, such as specific device applications, or parts thereof, may be temporarily loaded into a volatile store such as the RAM 106. Other software components can also be included, as is well known to those skilled in the art.

The subset of software applications 136 that control basic device operations, including data and voice communication applications, may be installed on the mobile device 10 during its manufacture. Other software applications include a message application 138 that can be any suitable software program that allows a user of the mobile device 10 to send and receive electronic messages. Various alternatives exist for the message application 138 as is well known to those skilled in the art. Messages that have been sent or received by the user are typically stored in the flash memory 108 of the mobile device 10 or some other suitable storage element in the mobile device 10. In at least some example embodiments, some of the sent and received messages may be stored remotely from the mobile device 10 such as in a data store of an associated host system that the mobile device 10 communicates with.

The software applications can further include a device state module 140, a Personal Information Manager (PIM) 142, and other suitable modules (not shown). The device state module 140 provides persistence, i.e. the device state module 140 ensures that important device data is stored in persistent memory, such as the flash memory 108, so that the data is not lost when the mobile device 10 is turned off or loses power.

The PIM 142 includes functionality for organizing and managing data items of interest to the user, such as, but not limited to, e-mail, contacts, calendar events, voice mails, appointments, and task items. A PIM application has the ability to send and receive data items via the wireless network 12. PIM data items may be seamlessly integrated, synchronized, and updated via the wireless network 12 with the mobile device subscriber's corresponding data items stored and/or associated with a host computer system. This functionality creates a mirrored host computer on the mobile device 10 with respect to such items. This can be particularly useful when the host computer system is the mobile device subscriber's office computer system.

The mobile device 10 may also include a connect module 144, and an IT policy module 146. The connect module 144 implements the communication protocols that are required for the mobile device 10 to communicate with the wireless infrastructure and any host system, such as an enterprise system, that the mobile device 10 is authorized to interface with.

The connect module 144 includes a set of APIs that can be integrated with the mobile device 10 to allow the mobile device 10 to use any number of services associated with the enterprise system. The connect module 144 allows the mobile device 10 to establish an end-to-end secure, authenticated communication pipe with a host system (not shown). A subset of applications for which access is provided by the connect module 144 can be used to pass IT policy commands from the host system to the mobile device 10. This can be done in a wireless or wired manner. These instructions can then be passed to the IT policy module 146 to modify the configuration of the device 10. Alternatively, in some cases, the IT policy update can also be done over a wired connection.

The IT policy module 146 receives IT policy data that encodes the IT policy. The IT policy module 146 then ensures that the IT policy data is authenticated by the mobile device 100. The IT policy data can then be stored in the flash memory 106 in its native form. After the IT policy data is stored, a global notification can be sent by the IT policy module 146 to all of the applications residing on the mobile device 10. Applications for which the IT policy may be applicable then respond by reading the IT policy data to look for IT policy rules that are applicable.

Other types of software applications or components 139 can also be installed on the mobile device 10. These software applications 139 can be pre-installed applications (i.e. other than message application 138) or third party applications, which are added after the manufacture of the mobile device 10. Examples of third party applications include games, calculators, utilities, etc.

The additional applications 139 can be loaded onto the mobile device 10 through at least one of the wireless network 12, the auxiliary I/O subsystem 112, the data port 114, the short-range communications subsystem 122, or any other suitable device subsystem 124. This flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The data port 114 enables a subscriber to set preferences through an external device or software application and extends the capabilities of the mobile device 10 by providing for information or software downloads to the mobile device 10 other than through a wireless communication network. The alternate download path may, for example, be used to load an encryption key onto the mobile device 10 through a direct and thus reliable and trusted connection to provide secure device communication.

The data port 114 can be any suitable port that enables data communication between the mobile device 10 and another computing device. The data port 114 can be a serial or a parallel port. In some instances, the data port 114 can be a USB port that includes data lines for data transfer and a supply line that can provide a charging current to charge the battery 130 of the mobile device 10.

The short-range communications subsystem 122 provides for communication between the mobile device 10 and different systems or devices, without the use of the wireless network 12. For example, the subsystem 122 may include an infrared device and associated circuits and components for short-range communication. Examples of short-range communication standards include standards developed by the Infrared Data Association (IrDA), Bluetooth, and the 802.11 family of standards developed by IEEE.

In use, a received signal such as a text message, an e-mail message, or web page download may be processed by the communication subsystem 104 and input to the main processor 102. The main processor 102 may then process the received signal for output to the display 110 or alternatively to the auxiliary I/O subsystem 112. A subscriber may also compose data items, such as e-mail messages, for example, using the keyboard 116 in conjunction with the display 110 and possibly the auxiliary I/O subsystem 112. The auxiliary subsystem 112 may include devices such as: a touch screen, mouse, track ball, infrared fingerprint detector, or a roller wheel with dynamic button pressing capability. The keyboard 116 is an alphanumeric keyboard and/or telephone-type keypad. However, other types of keyboards may also be used. A composed item may be transmitted over the wireless network 12 through the communication subsystem 104.

For voice communications, the overall operation of the mobile device 10 in this example is substantially similar, except that the received signals are output to the speaker 118, and signals for transmission are generated by the microphone 120. Alternative voice or audio I/O subsystems, such as a voice message recording subsystem, can also be implemented on the mobile device 10. Although voice or audio signal output is accomplished primarily through the speaker 118, the display 110 can also be used to provide additional information such as the identity of a calling party, duration of a voice call, or other voice call related information.

Figure 22:
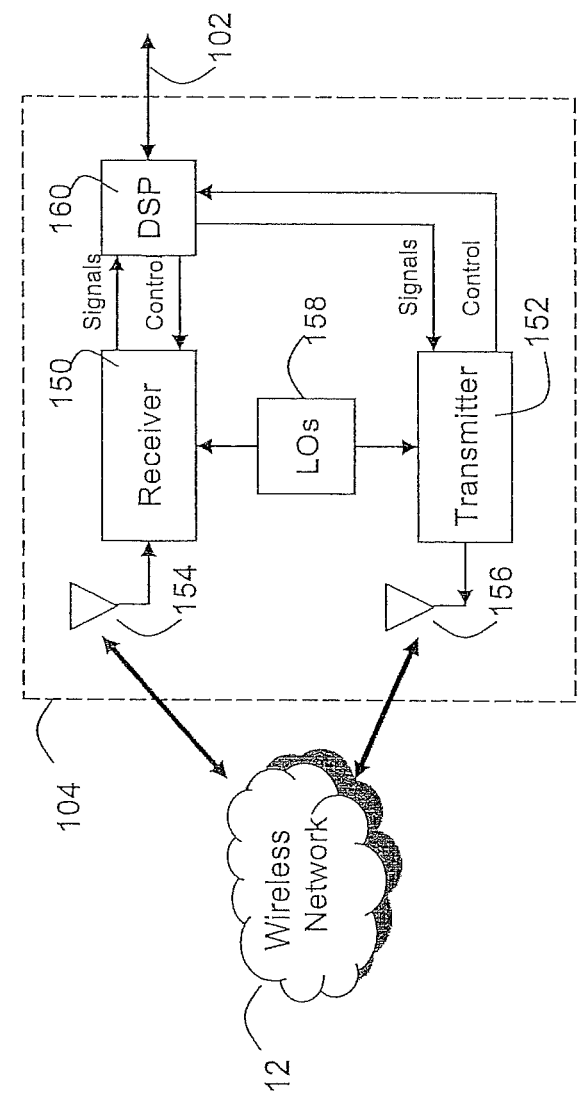
FIG. 22 is a block diagram of an example configuration for the communication sub-system shown in FIG. 21.

Referring now to FIG. 22, an example block diagram of the communication subsystem component 104 is shown. The communication subsystem 104 in this example includes a receiver 150, a transmitter 152, as well as associated components such as one or more embedded or internal antenna elements 154 and 156, Local Oscillators (LOs) 158, and a processing module such as a Digital Signal Processor (DSP) 160. The particular design of the communication subsystem 104 is typically dependent upon the communication network 12 with which the mobile device 10 is intended to operate. Thus, it should be understood that the design illustrated in FIG. 22 serves only as one example.

Signals received by the antenna 154 through the wireless network 12 are input to the receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in the DSP 160. In a similar manner, signals to be transmitted are processed, including modulation and encoding, by the DSP 160. These DSP-processed signals are input to the transmitter 152 for digital-to-analog (D/A) conversion, frequency up conversion, filtering, amplification and transmission over the wireless network 12 via the antenna 156. The DSP 160 not only processes communication signals, but also provides for receiver and transmitter control. For example, the gains applied to communication signals in the receiver 150 and the transmitter 152 may be adaptively controlled through automatic gain control algorithms implemented in the DSP 160.

The wireless link between the mobile device 10 and the wireless network 12 can contain one or more different channels, typically different RF channels, and associated protocols used between the mobile device 10 and the wireless network 12. An RF channel is a limited resource that must be conserved, typically due to limits in overall bandwidth and limited battery power of the mobile device 10.

When the mobile device 10 is fully operational, the transmitter 152 is typically keyed or turned on only when it is transmitting to the wireless network 12 and is otherwise turned off to conserve resources. Similarly, the receiver 150 is periodically turned off to conserve power until it is needed to receive signals or information (if at all) during designated time periods.

It will be appreciated that any module or component exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the mobile device 10 (or other computing or communication device that utilizes similar principles) or accessible or connectable thereto. Any application or module herein described may be implemented using computer readable/executable instructions that may be stored or otherwise held by such computer readable media.

It will also be appreciated that the example embodiments and corresponding diagrams used herein are for illustrative purposes only. Different configurations and terminology can be used without departing from the principles expressed herein. For instance, components and modules can be added, deleted, modified, or arranged with differing connections without departing from these principles.

The steps or operations in the flow charts and diagrams described herein are just for example. There may be many variations to these steps or operations without departing from the spirit of the invention or inventions. For instance, the steps may be performed in a differing order, or steps may be added, deleted, or modified.

Although the above principles have been described with reference to certain specific example embodiments, various modifications thereof will be apparent to those skilled in the art as outlined in the appended claims.

The invention claimed is:

1. A method of controlling a mobile device, the method comprising:
 during use of the mobile device, interpreting at least one keyword from a communication with a correspondent;
 correlating the at least one keyword with at least one search query for preemptively executing at least a portion of a task using features available on the mobile device;
 executing at least one of the at least one search query to generate at least one set of search results;
 determining if the correspondent is a current contact in a contact list or address book; and
 if the correspondent is not a current contact, generating a new contact for the contact list or address book using information obtainable from the communication.

2. The method according to claim 1, further comprising providing a prompt to obtain confirmation to execute the at least one search query prior to the executing.

3. The method according to claim 2, wherein providing the prompt comprises either: displaying a first user interface enabling selection of the at least one search query, or displaying a selectable icon for initiating the user interface.

4. The method according to claim 1, further comprising interpreting any one or more of a correlation between data, and an event detected on the mobile device.

5. The method according to claim 1, wherein the at least one keyword is detectable from one or more of a text-based communication, a voice-based communication, and data stored on the mobile device.

6. The method according to claim 4, wherein the correlating comprises a temporal correlation.

7. The method according to claim 1, further comprising any one or more of searching for related content, initiating a communication with a contact associated with the correspondent, and generating a reminder or calendar entry on the mobile device.

8. The method according to claim 1, further comprising generating a communication to send to the correspondent, the communication comprising one or more of a meeting request, and a text-based communication comprising at least a portion of the at least one search result.

9. A non-transitory computer readable storage medium comprising computer executable instructions for controlling a mobile device, the computer executable instructions comprising instructions for:
 during use of the mobile device, interpreting at least one keyword from a communication with a correspondent;
 correlating the at least one keyword with at least one search query for preemptively executing at least a portion of a task using features available on the mobile device;
 executing at least one of the at least one search query to generate at least one set of search results;
 determining if the correspondent is a current contact in a contact list or address book; and
 if the correspondent is not a current contact, generating a new contact for the contact list or address book using information obtainable from the communication.

10. The mobile device according to claim 9, further comprising instructions for interpreting any one or more of a correlation between data, and an event detected on the mobile device.

11. The mobile device according to claim 10, wherein the correlating comprises a temporal correlation.

12. A mobile device comprising a processor and memory, the memory comprising computer executable instructions for causing the processor to control the mobile device, the computer executable instructions comprising instructions for:
 during use of the mobile device, interpreting at least one keyword from a communication with a correspondent;
 correlating the at least one keyword with at least one search query for preemptively executing at least a portion of a task using features available on the mobile device;
 executing at least one of the at least one search query to generate at least one set of search results;
 determining if the correspondent is a current contact in a contact list or address book; and
 if the correspondent is not a current contact, generating a new contact for the contact list or address book using information obtainable from the communication.

13. The mobile device according to claim 12, further comprising instructions for providing a prompt to obtain confirmation to execute the at least one search query prior to the executing.

14. The mobile device according to claim 13, wherein providing the prompt comprises either: displaying a first user interface enabling selection of the at least one search query, or displaying a selectable icon for initiating the user interface.

15. The mobile device according to claim 12, wherein the at least one keyword is detectable from one or more of a text-based communication, a voice-based communication, and data stored on the mobile device.

16. The mobile device according to claim 12, further comprising instructions for any one or more of searching for related content, initiating a communication with a contact associated with the correspondent, and generating a reminder or calendar entry on the mobile device.

17. The mobile device according to claim 12, further comprising instructions for generating a communication to send to the correspondent, the communication comprising one or more of a meeting request, and a text-based communication comprising at least a portion of the at least one search result.

\* \* \* \* \*